United States Patent
Uzun et al.

(10) Patent No.: US 6,961,342 B1
(45) Date of Patent: Nov. 1, 2005

(54) METHODS AND APPARATUS FOR SWITCHING PACKETS

(75) Inventors: Necdet Uzun, 10 Galewood Dr., Holmdel, NJ (US) 07733; Feihong Chen, Harrison, NJ (US)

(73) Assignee: Necdet Uzun, Miami Beach, FL (US)

( * ) Notice: Subject to any disclaimer, the term of this patent is extended or adjusted under 35 U.S.C. 154(b) by 0 days.

(21) Appl. No.: 09/538,577

(22) Filed: Mar. 29, 2000

(51) Int. Cl.[7] .......................... H04L 12/56; G08L 15/00
(52) U.S. Cl. .................... 370/414; 370/230.1; 370/231; 370/450
(58) Field of Search ............................... 370/413–414, 370/450, 23, 229–231

(56) References Cited

U.S. PATENT DOCUMENTS 6,285,679 B1 * 9/2001 Dally et al. ................. 370/413
6,542,507 B1 * 4/2003 Khacherian et al. ... 370/395.43
6,633,568 B1 * 10/2003 Han et al. ................ 370/395.4
6,721,273 B1 * 4/2004 Lyon .......................... 370/235

OTHER PUBLICATIONS

Kung, Credit–Based Flow Control for ATM Networks, IEEE Network, Mar./Apr. 1995, p. 40–48.*

* cited by examiner

Primary Examiner—Chi Pham
Assistant Examiner—Ronald Abelson
(74) Attorney, Agent, or Firm—Straub & Pokotylo; John C. Pokotylo

(57) ABSTRACT

In Switches, switch inputs and outputs may be grouped into (e.g., small) modules called input shared blocks (or "ISBs") and output shared blocks (or "OSBs"), respectively. Each of the switches includes three (3) main parts: (i) input shared blocks (ISBs); (ii) a central switch fabric (or "ATMCSF"); and (iii) output shared blocks (OSBs). Input link sharing at every ISB-ATMCSF interface and output link sharing at every ATMCSF-OSB interface cooperate intelligently to resolve output contention and essentially eliminate any speedup requirement in central switch fabric. Each of the proposed switches can easily scale to a large size by cascading additional input and output shared blocks (ISBs and OSBs). Instead of using a centralized scheduler to resolve input and output contention, the each of the switches applies a distributed link reservation scheme upon which cell scheduling is based. In one embodiment, a dual round robin dynamic link reservation technique, in which an input shared block (ISB) only needs its local available information to arbitrate potential modification for its own link reservation, may be used.

16 Claims, 22 Drawing Sheets

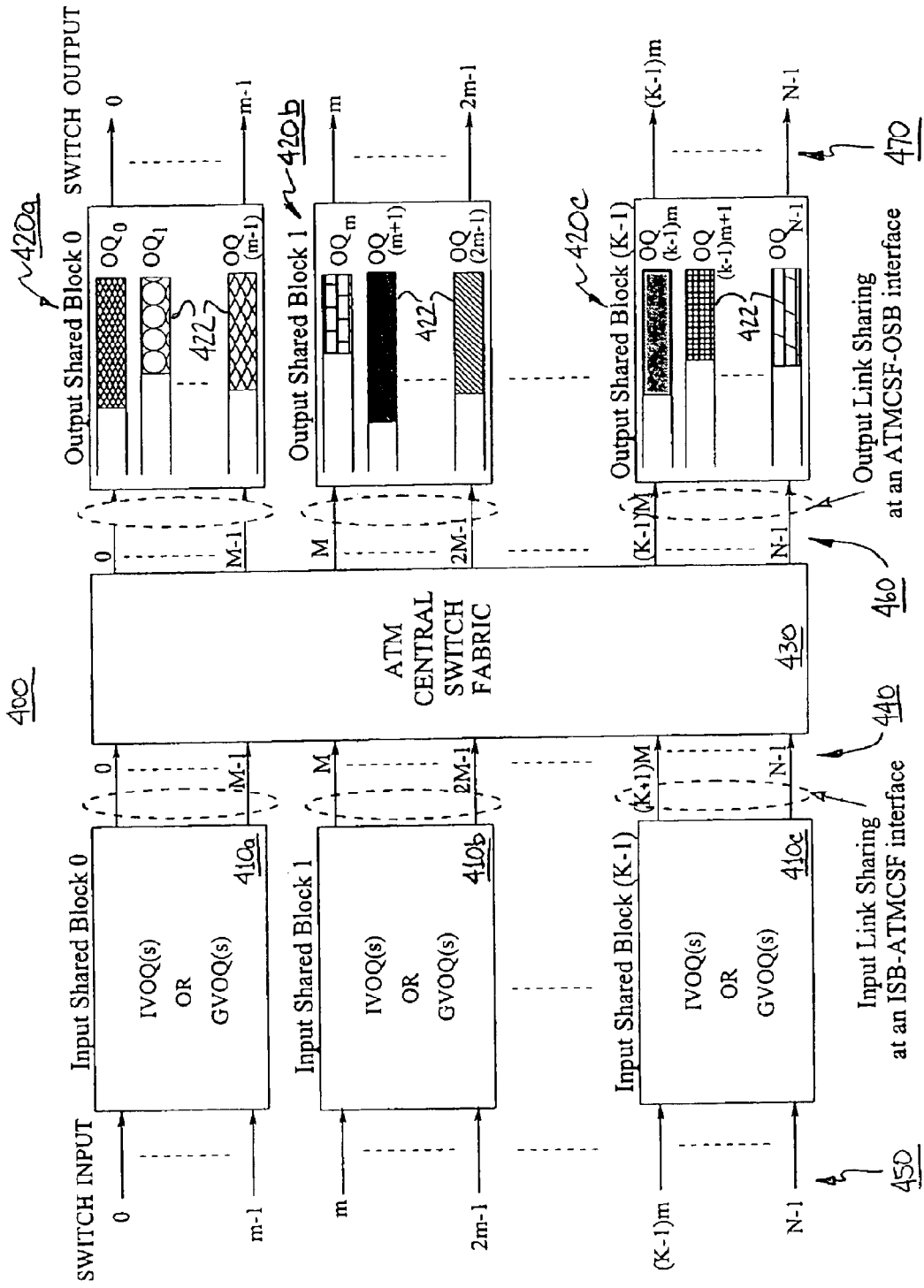

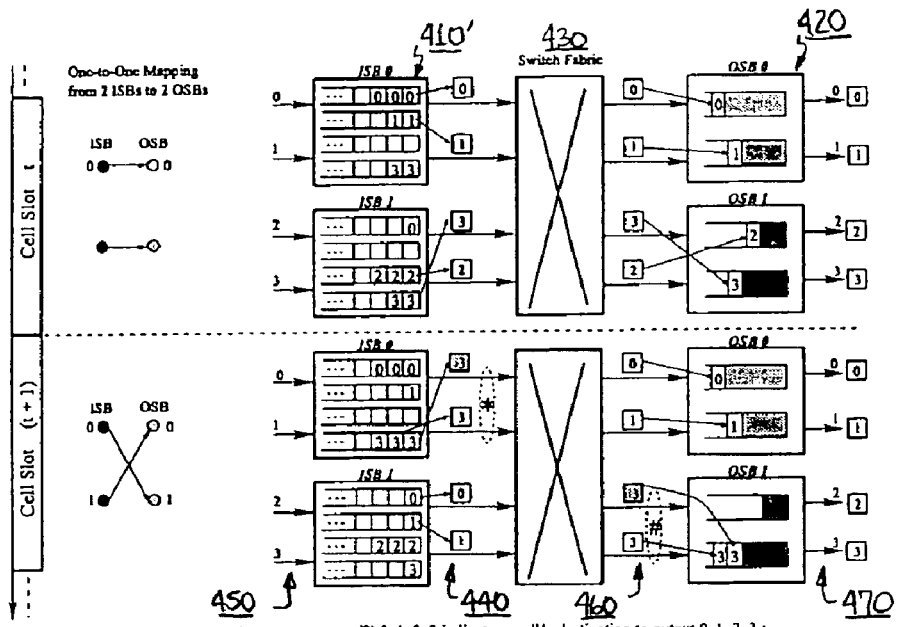

NOTE: (1) N = 4, K = 2, M = 2; (2) 0, 1, 2, 3 indicates a cell's destination to output 0, 1, 2, 3;
(3) ✱ : Input Link Sharing relaxes link starvation at an ISB-ATMCSF interface.
(4) # : Output Link Sharing eliminates speedup requirement in central switch fabric; ATMCSF needs to keep cell sequence.

FIGURE 9

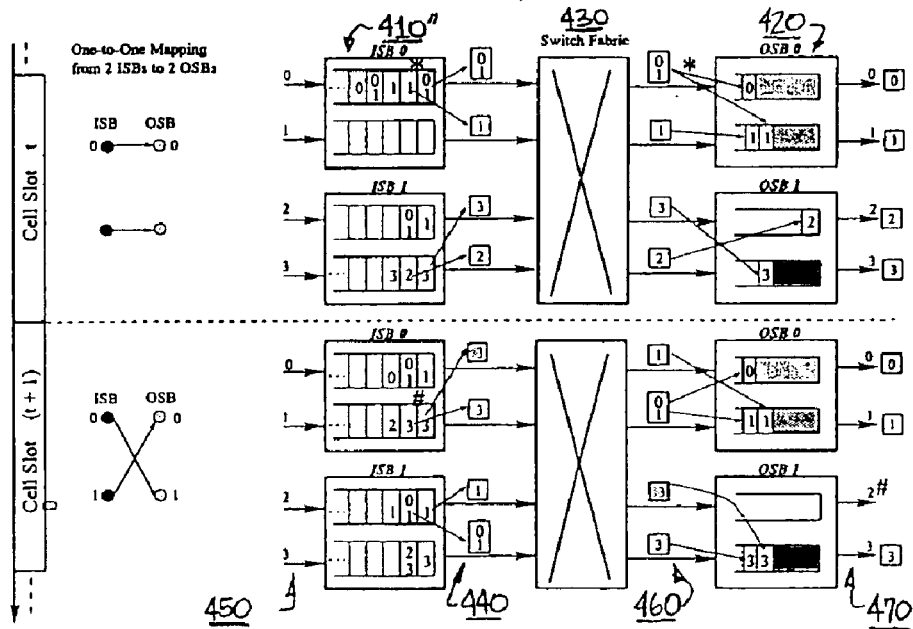

NOTE: (1) N = 4, K = 2, M = 2; (2) 0, 1, 2, 3 indicates a cell's destination to output 0, 1, 2, 3;
(3) ✱ : Advantages of GVOQ, i.e. scheduling is simpler, many cell copies are forwarded.
(4) # : Disadvantage of GVOQ, i.e. the cell going to output 2 is blocked by two cells destined to output 3.

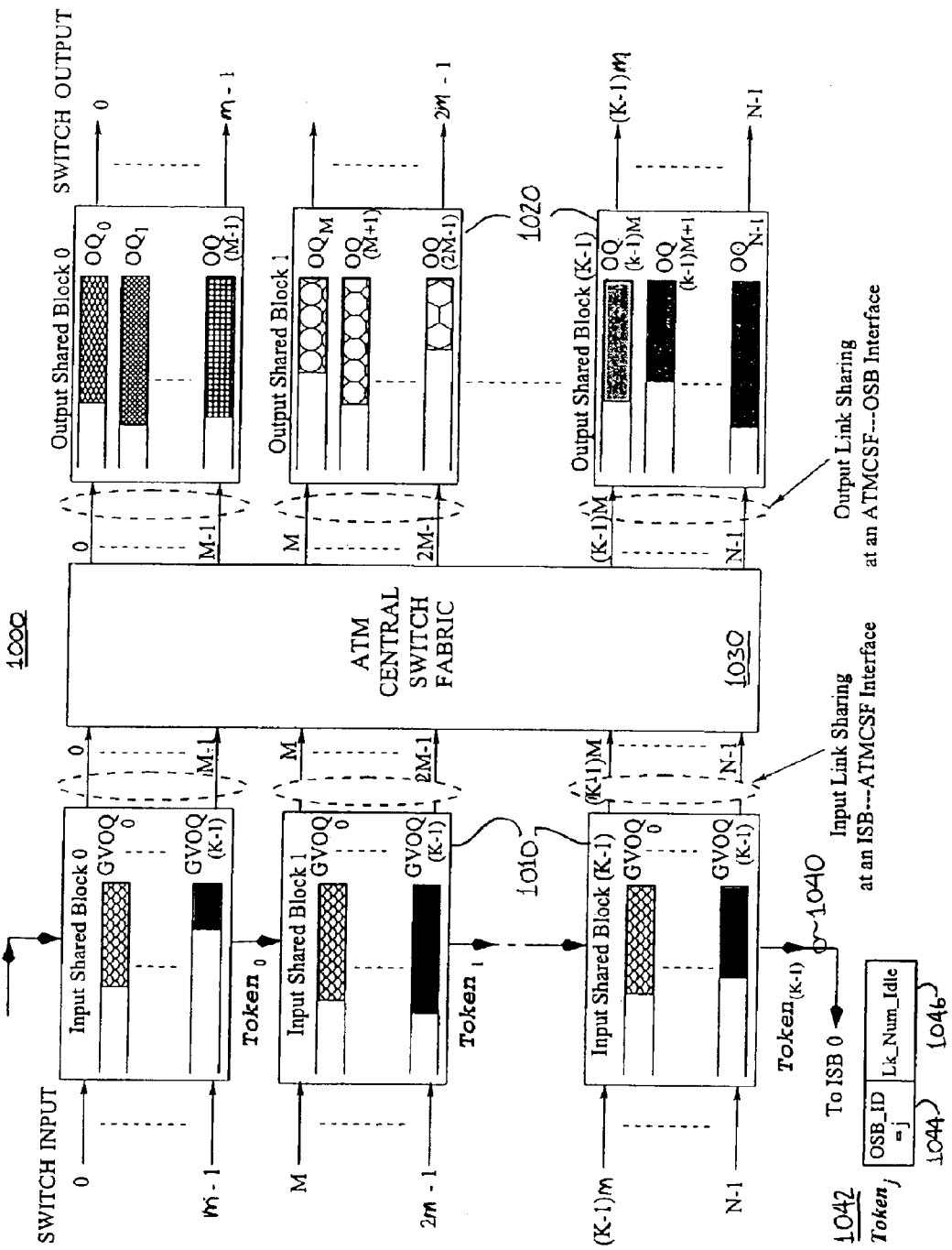

FIGURE 21

| | IF | | THEN | |
|---|---|---|---|---|
| | $q_j^i$ | $s_j^{i,old}$ | $s_j^i$ | REQ_NUM$_j$ |
| case 1 | > HT | 0 | 1 | In Step 3, REQ_NUM$_j$ ++; |
| case 2 | > HT | 1 | 1 | REQ_NUM$_j$ |
| case 3 | ≤ HT | 0 | 0 | REQ_NUM$_j$ |
| case 4 | ≤ HT | 1 | if (REQ_NUM$_j$ > 0) $s_j^i$ = 0; REQ_NUM$_j$ --; else $s_j^i$ = 1; | |

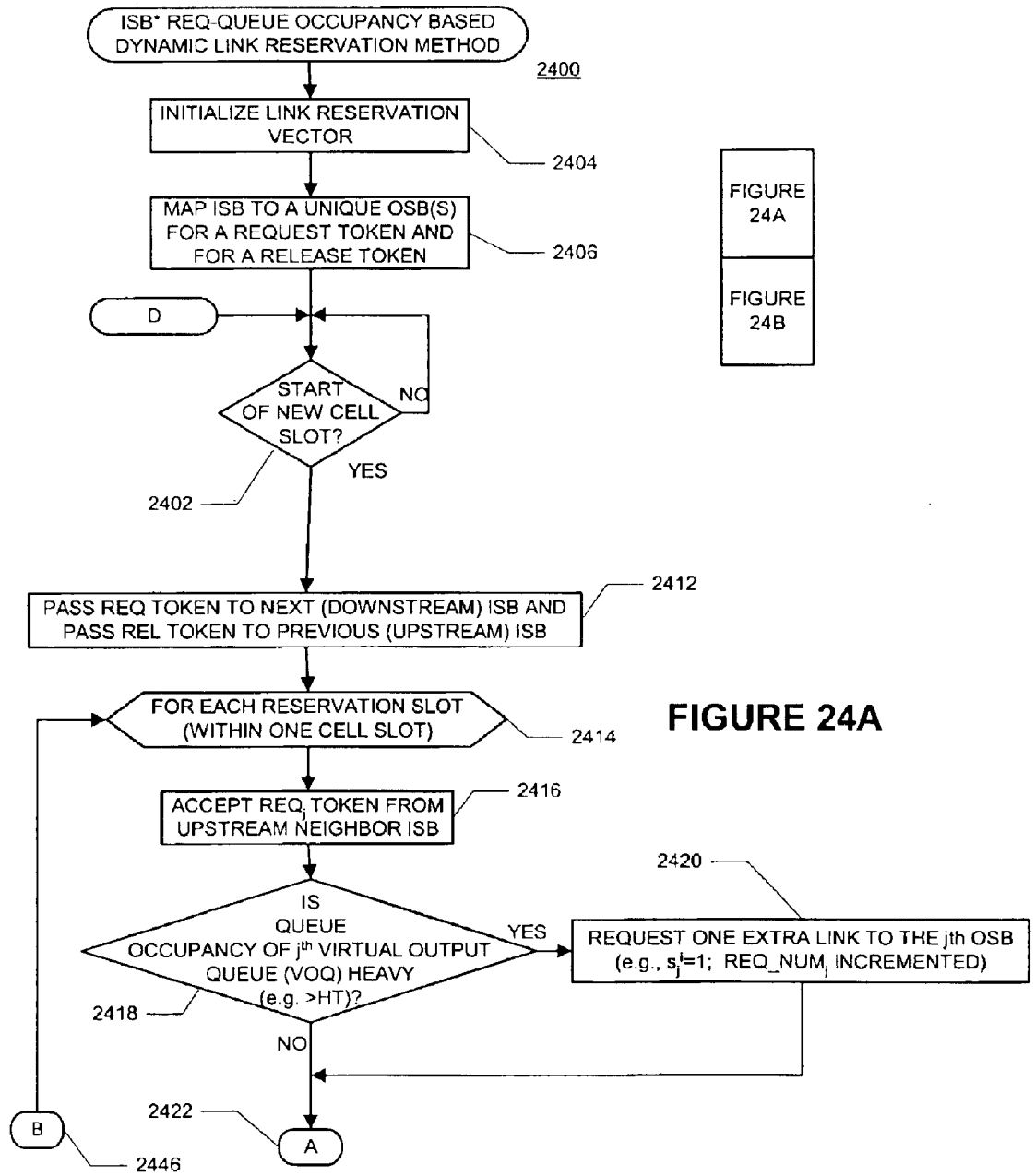

FIGURE 25

| | Queue Occupancy $LT_j \leq q_j^i \leq HT$ (area 1: light load) | Queue Occupancy $LT \leq q_j^i \leq HT$ (area 2: normal load) | Queue Occupancy $q_j^i > HT$ (area 3: heavy load) |
|---|---|---|---|
| Operation Upon Receiving REQ j (QOBDLR) | the $i^{th}$ ISB will request 0 extra link to the $j^{th}$ OSB; | if ((REQ_NUM$_j > 0$) and ($r_j^i > 0$)) then the ISB will release a link for OSB j. | the $i^{th}$ ISB will request 1 extra link to the $j^{th}$ OSB; |
| | | if ((REQ_NUM$_j > 0$) and ($r_j^i > Fair$)) then the ISB will release a link for OSB j |  |
| Operations Upon Receiving REL n (QOBDLR) | Queue Occupancy $q_n^i < LT$ (area 1: light load) | Queue Occupancy $LT \leq q_n^i \leq HT$ (area 2: normal load) | Queue Occupancy $q_n^i > HT$ (area 3: heavy load) |
| | if (($r_n^i > Fair$) or ($r_n^i > q_n^i$)) then the ISB will release a link for OSB n; | if (REL_NUM$_n > 0$) and ($\sum_{l=0}^{(k-1)} r_l^i < M$) and (the ISB has requested a link to the $n^{th}$ OSB) then the $i^{th}$ ISB will take a link from $REL_n$ token; | if (REL_NUM$_n > 0$) and ($\sum_{l=0}^{(k-1)} r_l^i < M$) then the $i^{th}$ ISB will take a link from $REL_n$ token; |

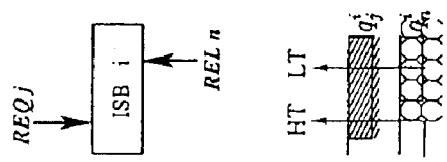

METHODS AND APPARATUS FOR SWITCHING PACKETS

§ 1. BACKGROUND OF THE INVENTION

§ 1.1. Field of the Invention

The present invention concerns methods and apparatus for fairly servicing queues at input ports of a switch (for switching ATM packets for example).

§ 1.2. Related Art

Since the present invention concerns a packet switch which may be used in a communications network, a brief history of communications networks, and the emergence of packet switching, is introduced in § 1.2.2 below. First, however, circuit switching and its limitations are introduced in § 1.2.1 below.

§ 1.2.1 Circuit Switching

The public switched telephone network (or "PSTN") was developed to carry voice communications to permit geographically remote people to communicate. Modems then came along, permitting computers to communicate data over the PSTN. Voice and modem communications over the PSTN use "circuit switching". Circuit switching inherently involves maintaining a continuous real time communications channel at the full channel bandwidth between two (2) points to continuously permit the transport of information throughout the duration of the call. Unfortunately, due to this inherent characteristic of circuit switching, it is inefficient for carrying "bursty" data traffic. Specifically, many services have relatively low information transfer rates—information transfer may occur as periodic bursts. Bursty communications do not require full channel bandwidth at all times during the duration of the call. Thus, when a circuit switched connection is used to carry bursty traffic, available communication bandwidth occurring between successive bursts is simply wasted.

Moreover, circuit switching is inflexible because the channel width is always the same. Thus, for example, a wide (e.g., 140 Mbit/second) channel would be used for all transmissions, even those requiring a very narrow bandwidth (e.g., 1 Kbit/second). In an attempt to solve the problem of wasted bandwidth occurring in circuit switching, multi-rate circuit switching was proposed. With multi-rate circuit switching, connections can have a bandwidth of a multiple of a basic channel rate (e.g., 1 Kbit/second). Although multi-rate circuit switching solves the problem of wasted bandwidth for services requiring only a narrow bandwidth, for services requiring a wide bandwidth, a number of multiple basic rate channels must be synchronized. This synchronization becomes extremely difficult for wide bandwidth services. For example, a 140 Mbit/second channel would require synchronizing 140,000 1-Kbit/second channels. Moreover, multi-rate circuit switching does not solve the inherent inefficiencies of a circuit switch, discussed above, when bursty data is involved.

Multi-rate circuit switching having multiple "basic rates" has also been proposed. Unfortunately, switches for multi-rate circuit switching are complex. Furthermore, the channel bandwidths are inflexible to meet new transmission rates. Moreover, most of the bandwidth might be idle when it is needed. Lastly, multiple basic rate circuit switching includes the inherent inefficiencies of a circuit switch, discussed above, when bursty data is involved.

In view of the above described problems with circuit switching, packet switched communications have become prevalent and are expected to be used extensively in the future. Two (2) communications protocols—TCP/IP and ATM—have become popular. Although one skilled in the art is familiar with the ATM protocol, it is introduced in § 1.2.3.1 below for the reader's convenience.

§ 1.2.2 The Emergence of Packet Switching

In recent decades, and in the past five to ten years in particular, computers have become interconnected by networks by an ever increasing extent—initially via local area networks (or "LANs"), and more recently via LANs, wide area networks (or "WANs") and the Internet. In 1969, the Advanced Research Projects Agency (ARPA) of the U.S. Department of Defense (DoD) deployed Arpanet as a way to explore packet switching technology and protocols that could be used for cooperative, distributed, computing. Early on, Arpanet was used by the TELNET application which permitted a single terminal to work with different types of computers, and by the file transfer protocol (or "FTP") which permitted different types of computers to transfer files from one another. In the early 1970s', electronic mail became the most popular application which used Arpanet.

This packet switching technology was so successful, that the ARPA applied it to tactical radio communications (Packet Radio) and to satellite communications (SATNET). However, since these networks operated in very different communications environments, certain parameters, such as maximum packet size for example, were different in each case. Thus, methods and protocols were developed for "internetworking" these different packet switched networks. This work led to the transmission control protocol (or "TCP") and the internet protocol (or "IP") which became the TCP/IP protocol suite.

§ 1.2.3 High Speed Packet Switched Networks

As just introduced above, there has been a trend from circuit switched networks towards packet switched networks. For example, packet switched communications presently appear to be the preferred mode of communication over a Broadband-Integrated Services Digital Network (of "B-ISDN") service. Packet switching includes normal packet switching (e.g., X.25) and fast packet switching (e.g., Asynchronous Transfer Mode or "ATM"). Normal packet switching assumes that certain errors at each data link are probable enough to require complex protocols so that such errors can be controlled at each link. Link errors were a valid assumption and concern at one time. However, today data links are very reliable such that the probability of errors being introduced by data links are not longer of any real concern. Hence, fast packet switching is becoming more prominent. One such fast packet switching protocol—ATM—is introduced in § 1.2.3.1 below.

§ 1.2.3.1 The Asynchronous Transfer Mode (ATM) Protocol

Since data links are very reliable and the probability of errors being introduced by data links are not longer of any great concern, ATM fast packet switching does not correct errors of control flow within the network (i.e., on a link-by-link basis). Instead, ATM is only concerned with three (3) types of errors—namely, bit errors, packet loss, and packet insertion. Bit errors are detected and/or corrected using end-to-end protocols. Regarding packet loss and insertion errors, ATM only uses prophylactic actions when allocating resources during connection set-up. That is, ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal. In this way, ATM reduces the number of overhead bits required which each cell and reduces the operations performed at each link in the network between the terminals communicating, thereby permitting ATM to operate at high data rates.

The ATM protocol transfers data in discrete sized chunks called "cells". The use of fixed sized cells simplifies the processing required at each network node (e.g., switch) thereby permitting ATM to operate at high data rates. The structure of ATM cells is described in more detail below.

Finally, the ATM protocol permits multiple logical (or "virtual") connections to be multiplexed over a single physical interface. As shown in FIG. 1, logical connections in ATM are referred to as virtual channel connections (or "VCCs") 110. A VCC 110 is the basic unit of switching in an ATM network. A VCC 110 is established between two (2) end users, through the network. A variable-rate, full-duplex flow of ATM cells may be exchanged over the VCC 110. VCCs 110 may also be used for control signaling, network management and routing.

A virtual path connection (or "VPC") 120 is a bundle of VCCs 110 that have the same end points. Accordingly, all of the cells flowing over all VCCs 110 in a single VPC 120 may be switched along the same path through the ATM network. In this way, the VPC 120 helps contain network control costs by grouping connections sharing common paths through the network. That is, network management actions can be applied to a small number of virtual paths 120 rather than a large number of individual virtual channels 110.

Finally, FIG. 1 illustrates that multiple virtual paths 120 and virtual channels 110 (i.e., logical connections) may be multiplexed over a single physical transmission path 130.

FIG. 2 illustrates the basic architecture for an interface between a user and a network using the ATM protocol. The physical layer 210 specifies a transmission medium and a signal-encoding (e.g., data rate and modulation) scheme. Data rates specified at the physical layer 210 may be 155.52 Mbps or 622.08 Mbps, for example. The ATM layer 220 defines the transmission of data in fixed sized cells and also defines the use of logical connections, both introduced above. The ATM adaptation layer (or "AAL") 230 supports information transfer protocols not based on ATM. It maps information between a high layer 240 and ATM cells.

Recall that the ATM layer 220 places data in fixed sized cells (also referred to as a packet). An ATM packet includes a header field (generally five (5) bytes) and payload (or information) field (generally 48 bytes). The main function of the header is to identify a virtual connection to guarantee that the ATM packet is properly routed through the network. Switching and/or multiplexing is first performed on virtual paths and then on virtual channels. The relatively short length of the payload or information field reduces the size required for internal buffers at switching nodes thereby reducing delay and delay jitter.

More specifically, FIG. 3A illustrates an ATM cell 300 having a header 310 as formatted at a user-network interface, while FIG. 3B illustrates the ATM cell 300' having a header 310' as formatted internal to the network.

Referring first to the header 310 as formatted at the user-network interface, a four (4) bit generic flow control field 312 may be used to assist an end user in controlling the flow of traffic for different qualities of service. The eight (8) bit virtual path identifier field 314 contains routing information for the network. Note that this field 314' is expanded to twelve (12) bits in header 310' as formatted in the network. In both headers 310 and 310', a sixteen (16) bit virtual channel identifier field 316 contains information for routing the cell to and from the end users. A three (3) bit payload type field 318 indicates the type of information in the 48 octet payload portion 350 of the packet. (The coding of this field is not particularly relevant for purposes of the present invention.) A one (1) bit cell loss priority field 320 contains information to let the network know what to do with the cell in the event of congestion. A value of 0 in this field 320 indicates that the cell is of relatively high priority and should not be discarded unless absolutely necessary. A value of 1 in this field indicates that the network may discard the cell. Finally, an eight (8) bit header error control field 322 contains information used for error detection and possibly error correction as well. The remaining 48 octets 350 define an information field.

Fast packet switching, such as ATM switching, has three (3) main advantages. First, ATM switching is flexible and is therefore safe for future transfer rates. Second, no resources are specialized and consequently, all resources may be optimally shared. Finally, ATM switches permit economies of scale for such a universal network.

Having introduced the ATM protocol, the basic components of an ATM switch, known ATM switches, and the limits of known ATM switches are described in § 1.2.3.2 below.

§ 1.2.3.2 Asynchronous Transfer Mode (ATM) Switches

ATM packets (cells) are routed through a network by means of a series of ATM switches. An ATM switch performs three (3) basic functions for point-to-point switching—namely, (i) routing the ATM cell, (ii) updating the virtual channel identifier (VCI) and virtual path identifier (VPI) in the ATM cell header (Recall fields 314, 314' and 316), and (iii) resolving output port contention (also referred to as "arbitration" or "scheduling"). The first two (2) functions, namely routing and updating, are performed by a translation table belonging to the ATM switch. The translation table converts an incoming link (input port) and VCI/VPI to an outgoing link (output port) and VCI/VPI. An arbiter is used to resolve output port contention among two or more ATM cells destined for the same output port. The arbiter chooses an ATM cell which "wins" contention (i.e., which is applied to the output port). Other ATM cells contenting for the output port "lose" contention (i.e., they must wait before being applied to the output port).

Switch fabric on which a switch architecture is built can be classified into three (3) types: (i) Banyan network; (ii) Crossbar network; and (iii) Clos network. The "Starlite" switch (See the article A. Huang and S. Knauer, "STARLITE: A Wideband Digital Switch," *Proc. IEEE GLOBECOM '84*, pp. 121–125 (December 1984)), Turner's broadcast switch (See the article J. S. Turner, "Design of a Broadcast Packet Switching Network," *IEEE Trans. on Commun.*, Vol. 36, pp. 734–743 (June 1988)) and Lee's multicast switch (See the article T. T. Lee, "Nonblocking Copy Networks for Multicast Packet Switching," *IEEE J. on Select. Areas in Commun.*, Vol. 6, pp. 1445–1467 (December 1988)) are the typical multicast ATM switches based on a Banyan network. Those switches have an advantage of a reduced hardware complexity. However, internal path conflict and head of line (HOL) blocking have limited the performance and scalability of those switches.

One of the switches built on crossbar network is the "Knockout Multicast" switch (See the article K. Y. Eng, M. G. Hluchyj, Y. S. Yeh, "Multicast and Broadcast Services in a Knockout Packet Switch," *Proc. of INFOCOM '88*, pp. 29–34 (1988)), which utilizes a concentrator in every output port to resolve output contention. Following the "Knockout Multicast" switch, SCOQ (See the article M. H. Guo, R. S. Chang, "Multicast ATM Switches: Survey and Performance Evaluation," *Computer Communication Review*, Vol 28, No. 2, pp. 98–131 (April 1998)), MOBAS (See the article H. J. Chao, B. S. Choe, "Design and Analysis of A Large-Scale Multicast Output Buffered ATM Switch," *IEEE/ACM Trans. on Networking*, Vol. 3, No. 2, pp. 126–138 (April 1995)), Abacus (See the article H. J. Chao, B. S. Choe, J. S. Park, N. Uzun, "Design and Implementation of Abacus Switch: A Scalable Multicast ATM Switch," *IEEE J. on Select. Areas in Commun.*, Vol. 15, No. 5, pp. 830–843 (June 1997)), and a growable multicast switch (See the article K. Wang, M. H. Cheng, "Design and Performance Analysis of a Growable Multicast ATM Switch," *Proc. of INFOCOM'97*, pp. 934–940 (1997)) were proposed. Crossbar switches can achieve high performance because of output queuing and output contention resolution. The tradeoff is the cost of hardware complexity and speedup required.

Growable packet switch (See the article D. J. Marchok, C. E. Rohrs, R. M. Schafer, "Multicasting in a Growable Packet (ATM) Switch," *INFOCOM'91*, pp. 850–858 (1991)) and ring sandwich network (See the article Y. Yang, G. M. Masson, "Broadcast Ring Sandwich Networks," *IEEE Trans. on Computers*, Vol 44, pp. 1169–1180 (October 1995)) are multicast ATM switches based on Clos network. In fact, Clos network belongs to multistage interconnection network (MIN) but it only has three (3) stages. Since Clos network can provide multiple paths from an input port to an output port, internal path conflicts are relaxed. However, Clos network-based switches still suffer from head-of-line (HOL) blocking because an output port only accepts one cell in a cell slot, as was the case in Banyan network-based switches.

Existing packet switches, including the above-mentioned multicast switches can achieve Gigabit/sec capacity. Unfortunately, however, few of them provide further scalability to Terabit/sec. Besides switch fabric restraints, queuing strategy and cooperated scheduling scheme have a great impact on switch scalability.

To prevent the ATM cells not winning contention for an output port from being lost, buffering is required. There are three (3) basic buffering strategies—namely, pure input queuing, pure output queuing and central queuing. Pure input queuing provides a dedicated buffer at each input port. Arbitration logic is used to decide which input buffer will be next served. The arbitration logic may be simple (e.g., round robin in which the input buffers are served in order, or random in which the input buffers are served randomly) or complex (e.g., state dependent in which the most filled buffer is served next, or delay dependent in which the globally oldest cell is served next).

Input-queued (IQ) switches have become more attractive because the switch fabric and input memory only need to run as fast as the line rate. An input-queued (IQ) switch with first-in-first-out (FIFO) queues is known to suffer head-of-line (HOL) blocking which limits the throughput to 58.6% ($=2-\sqrt{2}$). To overcome HOL blocking, virtual output queues (VOQs) are applied in every switch input together with scheduling algorithms like Longest Queue First (LQF) (See the article N. Mckeown, V. Anantharam, J. Walrand, "Achieving 100% Throughput in an Input-Queued Switch," *Proc. of IEEE INFOCOM'96*, (March 1996)), Oldest Cell First (OCF) (See the article A. Mekkittikul, N. McKeown, "A Starvation-free Algorithm For Achieving 100% Throughput in an Input-Queued Switch," *Proc. of ICCCN96*, (1996)), Longest Port First (LPF) (See the article A. Mekkittikul, N. Mckeown, "A Practical Scheduling Algorithm to Achieve 100% Throughput in Input-Queued Switches," *Proc. of IEEE INFOCOM98* (April 1998)) to achieve 100% maximized throughput. To support multicast traffic, TATRA and WBA were proposed for input-queued (IQ) switches (See the article B. Prabhakar, N. Mckeown, R. Ahuja, "Multicast Scheduling for Input-Queued Switches," *IEEE J. on Select. Areas in Commun.*, Vol. 6, (May 1996)). A combined input output queued (CIOQ) switch has been proposed (See, e.g., S-T. Chuang, A. Goel, N. Mckeown, B. Prabhakar, "Matching Output Queuing with Combined Input/Output-Queued Switch," *IEEE J. on Select. Areas in Commun.*, Vol. 17, No. 6, pp. 1030–1039 (June 1999)). It has been demonstrated that the CIOQ switch can precisely emulate the output queued (OQ) switch when speedup ($S \geq 2-1/N$).

Though input-queued (IQ) switches can support high speed line rate without any speedup in hardware, scheduling complexity of at least $O(N^{2.5})$ is a big obstacle when input queued (IQ) switches grow to a large size (i.e., a large number N of input or output ports). The reason is that, most scheduling algorithms (See the articles: N. Mckeown, V. Anantharam, J. Walrand, "Achieving 100% Throughput in an Input-Queued Switch," *Proc. of IEEE INFOCOM96*, (March 1996); A. Mekkittikul, N. McKeown, "A Starvation-free Algorithm For Achieving 100% Throughput in an Input-Queued Switch," *Proc. of ICCCN96*, (1996); A. Mekkittikul, N. Mckeown, "A Practical Scheduling Algorithm to Achieve 100% Throughput in Input-Queued Switches," *Proc. of IEEE INFOCOM98*, (April 1998); S-T. Chuang, A. Goel, N. Mckeown, B. Prabhakar, "Matching Output Queuing with Combined Input/Output-Queued Switch," *IEEE J. on Select. Areas in Commun.*, Vol. 17, No. 6, pp. 1030–1039 (June 1999); and B. Prabhakar, N. Mckeown, R. Ahuja, "Multicast Scheduling for Input-Queued Switches," *IEEE J. on Select. Areas in Commun.*, Vol. 6, (May 1996)) proposed for input-queued (IQ) switches employ a centralized scheduler, which needs to collect traffic information from N switch inputs in every cell slot and consumes multiple iterations to determine the final input-output matching. The situation may become more complex under multicast traffic. As scheduling complexity increases with switch size N, an input-queued (IQ) switch using a centralized scheduler has difficulties in growing to a large switch size and terabit/sec capacity. Unfortunately, with input queuing, an ATM cell in the front of the queue waiting for an occupied output channel to become available may block other ATM cells behind it which do not need to wait. This is known as head-of-line blocking. A post office metaphor has been used to illustrate head-of-ling blocking in the book, M. dePrycker, *Asynchronous Transfer Mode: Solution for Broadband ISDN*, pp. 133–137 (Ellis Horwood Ltd., 1991). In the post office metaphor, people (representing ATM cells) are waiting in a line (representing an input buffer) for either a stamp window (representing a first output port) or an airmail window (representing a second output port). Assume that someone (an ATM cell) is already at the stamp window (the first output port) and that the first person in line (the HOL cell of the input buffer) needs to go to the stamp window (the first output port). Assume further that no one is presently at the airmail window (the second output port) and that the second and third people in line (the ATM cells behind the HOL cell in the input queue) want to go to the airmail window (the second output port). Although the airmail window (the second output port) is available, the second and third people (ATM cells behind the HOL cell) must wait for the first person (the HOL cell) who is waiting for the stamp window (the first output port) to become free. Therefore, as the post office metaphor illustrates, the head-of-line (HOL) cell waiting for an output port to become free often blocks ATM cells behind it which would otherwise not have to wait. Simulations have should that such head-of-line (HOL) blocking decreases switch throughput.

Pure output buffering solves the head-of-line (HOL) blocking problems of pure input buffering by providing only the output ports with buffers. Since the ATM cells buffered at an output port are output in sequence (i.e., first in, first out, or "FIFO"), no arbitration logic is required. In the post office metaphor, the stamp window (first output port) has its own line (first output buffer) and the airmail window (second output port) has its own line (second output buffer).

Although pure output buffering clearly avoids HOL blocking that may occur in pure input port buffering, it does have some disadvantages. Specifically, to avoid cell loss, assuming N input ports, the system must be able to write N ATM cells into any one of the queues (or output buffers) during one cell time (i.e., within 2.8 microseconds, where 2.8 microseconds is (53 bytes*8 bits/byte)/155.52 Mbit/second. Such a high memory write rate is needed because it is possible that each of the ATM cells arriving at each of the input ports will require the same output port. This requirement on the memory speed of the output buffer becomes a problem as the size of the switch (i.e., the number N of input ports and output ports) increases. Accordingly, for some large switches, pure output buffering is not feasible because the speed of the output port buffers would have to be large enough and/or fast enough to handle N cells in each cell slot. Output-queued (OQ) switches, (See e.g., the articles: K. Y. Eng, M. G. Hluchyj, Y. S. Yeh, "Multicast and Broadcast Services in a Knockout Packet Switch," *Proc. of INFOCOM'88*, pp. 29–34 (1988); H. J. Chao, B. S. Choe, "Design and Analysis of A Large-Scale Multicast Output Buffered ATM Switch," *IEEE/ACM Trans. on Networking*, Vol. 3, No. 2, pp. 126–138 (April 1995); H. J. Chao, B. S. Choe, J. S. Park, N. Uzun, "Design and Implementation of Abacus Switch: A Scalable Multicast ATM Switch," *IEEE J. on Select. Areas in Commun.*, Vol. 15, No. 5, pp. 830–843 (June 1997); K. Wang, M. H. Cheng, "Design and Performance Analysis of a Growable Multicast ATM Switch," *Proc. of INFOCOM'97*, pp. 934–940 (1997); M. R. Hashemi, A. Leon-Garcia, "The Single-Queue Switch: A Building Block for Switches with Programmable Scheduling," *IEEE J. on Select. Areas on Commun.*, Vol. 15, No. 5, pp. 785–793 (June 1997); and A. K. Choudhury, E. L. Hahne, "A New Buffer Management Scheme for Hierarchical Shared Memory Switches," *IEEE/ACM Transactions on Networking*, Vol. 5, No. 5, pp. 728–738 (October 1997)) maximize throughput and optimize latency. Hence, output queued (OQ) switches can provide quality of service (QoS) guarantees. Unfortunately, however, switch fabric and output buffer have to run N (where N is the switch size) times as fast as the line rate, because cells arriving at switch inputs have to be delivered to and stored in output queues in a same cell slot. It may be practical to implement an output queued switch or router with an aggregated bandwidth of several 10 Gbps. However, at this time, building an output-queued (OQ) switch with a large number of ports and fast line rate is impractical because sufficient memory bandwidth to provide N times speedup is not yet available.

Input-output-queued (IOQ) switches are combinations of input-queued (IQ) switches and output-queued (OQ) switches. One of few input-output-queued (IOQ) switch designs is CIOQ switch (See, e.g., the article S-T. Chuang, A. Goel, N. Mckeown, B. Prabhakar, "Matching Output Queuing with Combined Input/Output-Queued Switch," *IEEE J. on Select. Areas in Commun.*, Vol. 17, No. 6, pp. 1030–1039 (June 1999)). The CIOQ switch in the Chuang article adopted both input queuing and output queuing to provide QoS in input-queued (IQ) switches. As speedup is required in input-queued (IQ) switches for QoS purpose, output queuing is needed to avoid cell loss. The CIOQ switch, in fact, can be classified as an input-queued (IQ) switch. The centralized scheduler sustains an arbitration complexity of $O(N^{2.5})$. Accordingly, the CIOQ switch is not feasible for a large scale switch.

Central queuing includes a queue not assigned to any inlet (input port) or outlet (output port). Each outlet will select ATM cells destined for it in a first in, first out (or "FIFO") manner. However, the outlets must be able to know which cells are destined for them. Moreover, the read and write discipline of the central queue cannot be a simple FIFO because ATM cells destined for different outlets are all merged into a single queue. Turning again to the post office metaphor, a single line (central queue) of people (ATM cells) are waiting to visit the stamp window (the first output port) or the airmail window (the second output port). As a window opens up (as an output port becomes available), a server searches the line (central queue) for the next person (ATM cell) needing the available window (requiring the available output port). The server brings that person (ATM cell) to the open window (available output port) regardless of whether the person (the ATM cell) is at the front of the line (HOL). As the post office metaphor illustrates, the central queue requires a complex memory management system given the random accessibility required. Of course, the memory management system becomes more complex and cumbersome when the number of output ports (i.e., the size of the switch) increases.

Thus, conceptually, an ATM switch may include input port controllers for accepting ATM cells from various physical (or logical) links (Recall FIG. 1), a switching fabric for forwarding cells to another link towards their destination, and output port controllers for delivering ATM cells to various physical (or logical) links.

§ 1.3 Unmet Needs

While the growth of the Internet has opened a primary route of information exchange for millions of people around the world, it has also created unprecedented demand for core network capacity. The network backbone needs to deliver higher performance in terms of both speed and scalability. In addition, components of the network backbone are also being called upon to support different quality of service (QoS) levels.

The present inventors believe that terabit backbone switches/routers are needed to efficiently support inevitable increases in backbone bandwidth so that congestion at the core of the network can be relieved. Although existing switches/routers can reach a capacity on the order of gigabits per second, switch architecture and/or scheduling complexity bottlenecks have prevented most from scaling to terabit capacity. Scheduling complexity is often a function of the size of the switch (i.e., the number of input or output ports). A scheduling technique with an exponential function of the switch size (e.g., $c^N$, where c is a constant and N is the number of input or output ports) severely limits the size and/or speed of the switch. A scheduling technique with a polynomial function of switch size (e.g., $aN+bN^2+cN^3$, where a, b, and c are constants and N is the number of input or output ports) still presents a limit to the size and/or speed of the switch. A scheduling technique with a linear function of the switch size (e.g., $a+bN$, where a and b are constants and N is the number of input or output ports) would be considered a good technique for achieving size and speed.

Finally, a scheduling technique which is independent of the switch size would enable switches of almost unlimited size and speed to be constructed.

Any scheduling technique should also be "fair". That is, cells should not be treated differently as far as scheduling is concerned (unless, of course, the cells specify and the network supports different quality of service (QoS) levels).

With the foregoing background in mind, a new switch is needed. This new switch should ideally employ a scheduling technique which is independent of switch size. In this way, the size of the switch would, at least in theory, be scalable without limit. Although output queued switches provide such a scheduling techniques, switch fabric speedup, output buffer memory and output buffer size requirements make such switches unattractive for large scale applications. Naturally, such a new switch should be fair.

§ 2. SUMMARY OF THE INVENTION

The present invention teaches novel input-output queued (IOQ) switches which benefit from a modular switch architecture and a distributed resource allocation scheme to achieve a scalable terabit multicast packet switch. Each of the switches taught by the present invention has a unique design and enjoys high scalability due to its modular configuration and distributed scheduling technique.

In each of the switches, switch inputs and outputs may be grouped into (e.g., small) modules called input shared blocks (or "ISBs") and output shared blocks (or "OSBs"), respectively. Each of the switches includes three (3) main parts: (i) input shared blocks (ISBs); (ii) a central switch fabric (or "ATMCSF"); and (iii) output shared blocks (OSBs). Input link sharing at every ISB-ATMCSF interface and output link sharing at every ATMCSF-OSB interface cooperate intelligently to resolve output contention and essentially eliminate any speedup requirement in central switch fabric (although speedup can be implemented. Each of the proposed switches can easily scale to a large size by cascading additional input and output shared blocks (ISBs and OSBs).

Instead of using a centralized scheduler to resolve input and output contention, the each of the switches of the present invention applies a distributed link reservation scheme upon which cell scheduling is based. In one embodiment, a dual round robin dynamic link reservation technique, in which an input shared block (ISB) only needs its local available information to arbitrate potential modification for its own link reservation, may be used. A fast and fair link resource allocation among input shared blocks (ISBs) can be achieved through link request tokens and link release tokens conveyed on dual rings. Arbitration complexity is on the order of one (O(1)) so that scheduling complexity is no longer an obstacle to switch growth.

Each of the switches of the present invention may employ a grouped virtual output queues (GVOQ) for memory management in every input shared block (ISB). Basically, there may be K (where K is the number of output shared blocks (OSBs)) grouped virtual output queues in every input shared block (ISB). Each virtual queue stores cells going to the same output shared block (OSB). The grouped virtual output queue (GVOQ) scheme is different from virtual output queue (VOQ) schemes proposed for input-queued (IQ) switches where every input port has to maintain N (where N is the switch size, and N>>K) virtual output queues and each virtual queue saves cells going to the same switch output. Compared with the virtual output queue (VOQ) scheme, the grouped virtual output queue (GVOQ) is a cost-effective strategy for the proposed switch because using grouped virtual output queues (GVOQs) results in a simpler scheduling arbitration due to fewer queues in every input shared block (ISB).

Additionally, in an exemplary switch of the present invention, output shared blocks (OSBs) can incorporate per virtual channel (VC) queuing with appropriate cell schedulers to provide quality of service (QoS) guarantees.

One embodiment of the scalable multicast packet switch of the present invention may use link sharing and a dual round robin dynamic link reservation scheme. This switch of the present invention benefits from unique features of a modular switch architecture and a distributed dynamic resource allocation scheme. The switch architecture includes three (3) main parts: (i) input shared blocks (ISBs); (ii) a central switch fabric (ATMCSF); and (iii) output shared blocks (OSBs). Input link sharing at every ISB-ATMCSF interface and output link sharing at every ATMCSF-OSB interface are cooperated intelligently so that no speedup is necessary (although speedup can be implemented) in central switch fabric. Input shared blocks (ISBs) are connected by dual round robin rings which convey link request tokens (REQs) and link release tokens (RELs) respectively. Cell delivery is based on link reservation in every input shared block (ISB). That is, each input shared block (ISB) should reserve a link reservation in advance to obtain the desired links at the targeted ATMCSF-OSB interfaces.

A queue occupancy-based dynamic link reservation scheduling technique may be used to achieve a fast and fair link resource allocation among input shared blocks (ISBs). The queue occupancy based dynamic link reservation (QOBDLR) is a distributed link reservation algorithm in which an input shared block (ISB), according to its local available information, can dynamically increase and/or decrease its own link reservation by "borrowing" and/or "lending" links through REQ and REL tokens. Arbitration complexity of queue occupancy based dynamic link reservation (QOBDLR) algorithm is on the order of 1 ((O(1)). The performance of the switch of the present invention is comparable to that of the output queued (OQ) switch.

§ 3. BRIEF DESCRIPTION OF THE DRAWINGS

FIG. 4 is a block diagram of a first exemplary switch architecture of the present invention.

FIG. 8 illustrates an operation of the first exemplary switch when individual virtual output queues are used in the input shared blocks.

FIG. 9 illustrates an operation of the first exemplary switch when grouped virtual output queues are used in the input shared blocks.

FIG. 10 is a block diagram of a second exemplary switch architecture of the present invention.

Figure 11A:
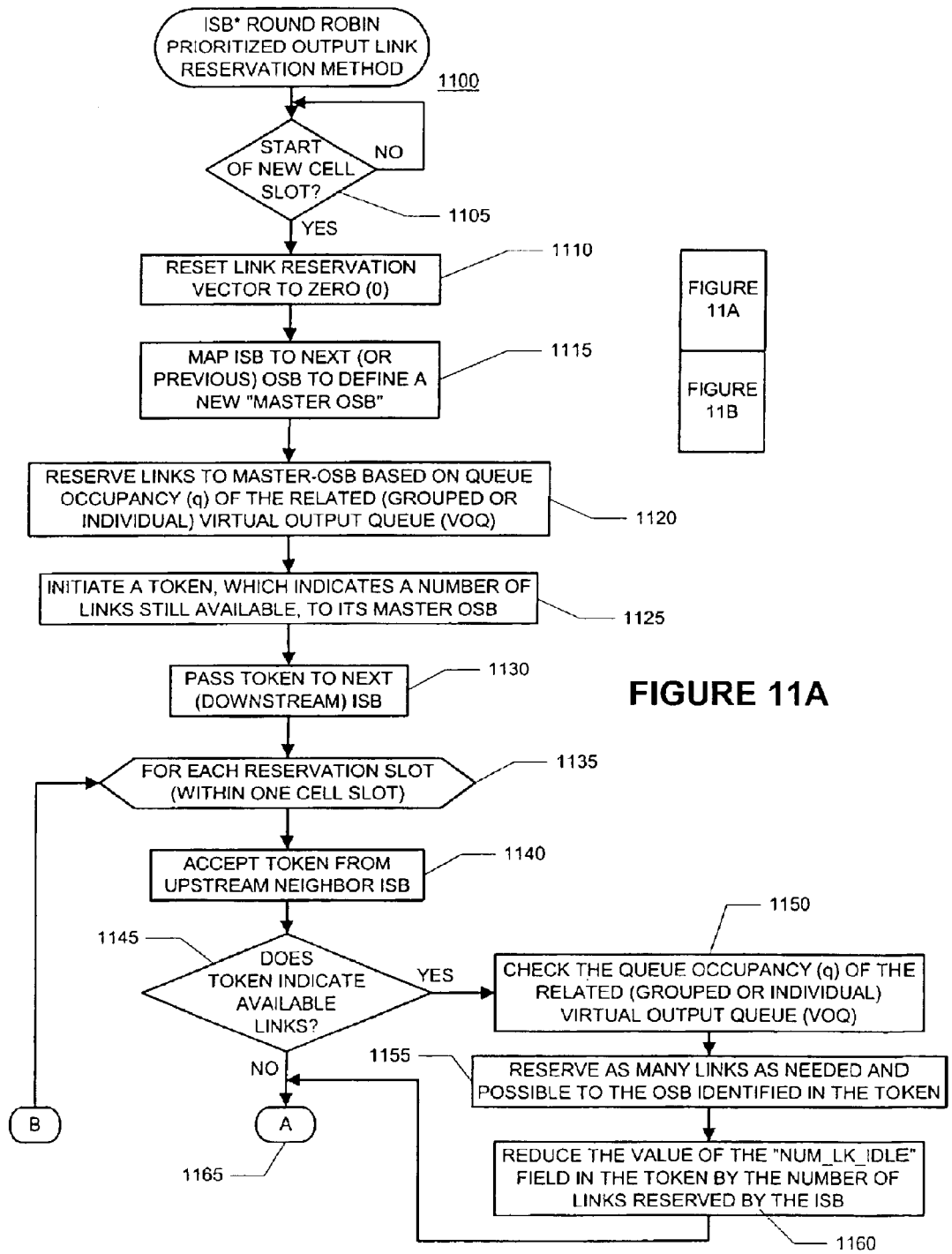
Figure 11B:
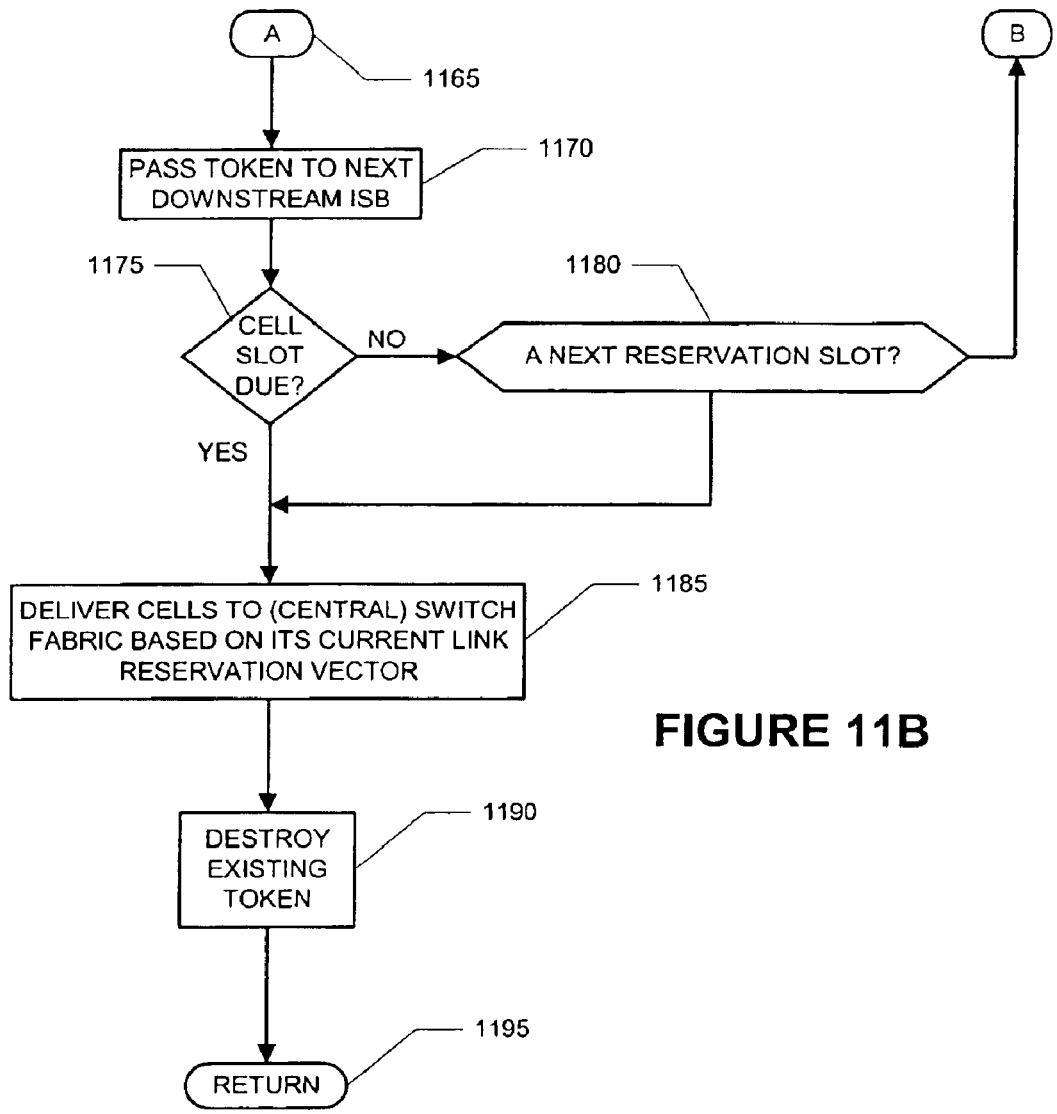

FIG. 11, which includes FIGS. 11A and 11B, is a flow diagram of an exemplary scheduling method which may be used by the second switch of FIG. 10.

Figure 12:
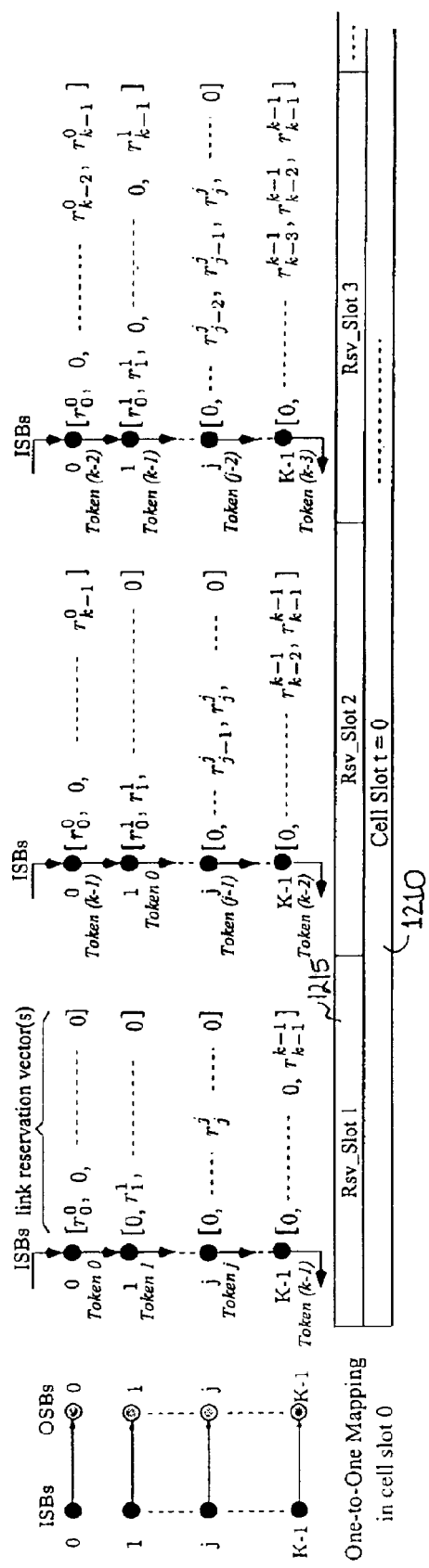

FIG. 12 illustrates operations of the second switch of FIG. 10.

Figure 13:
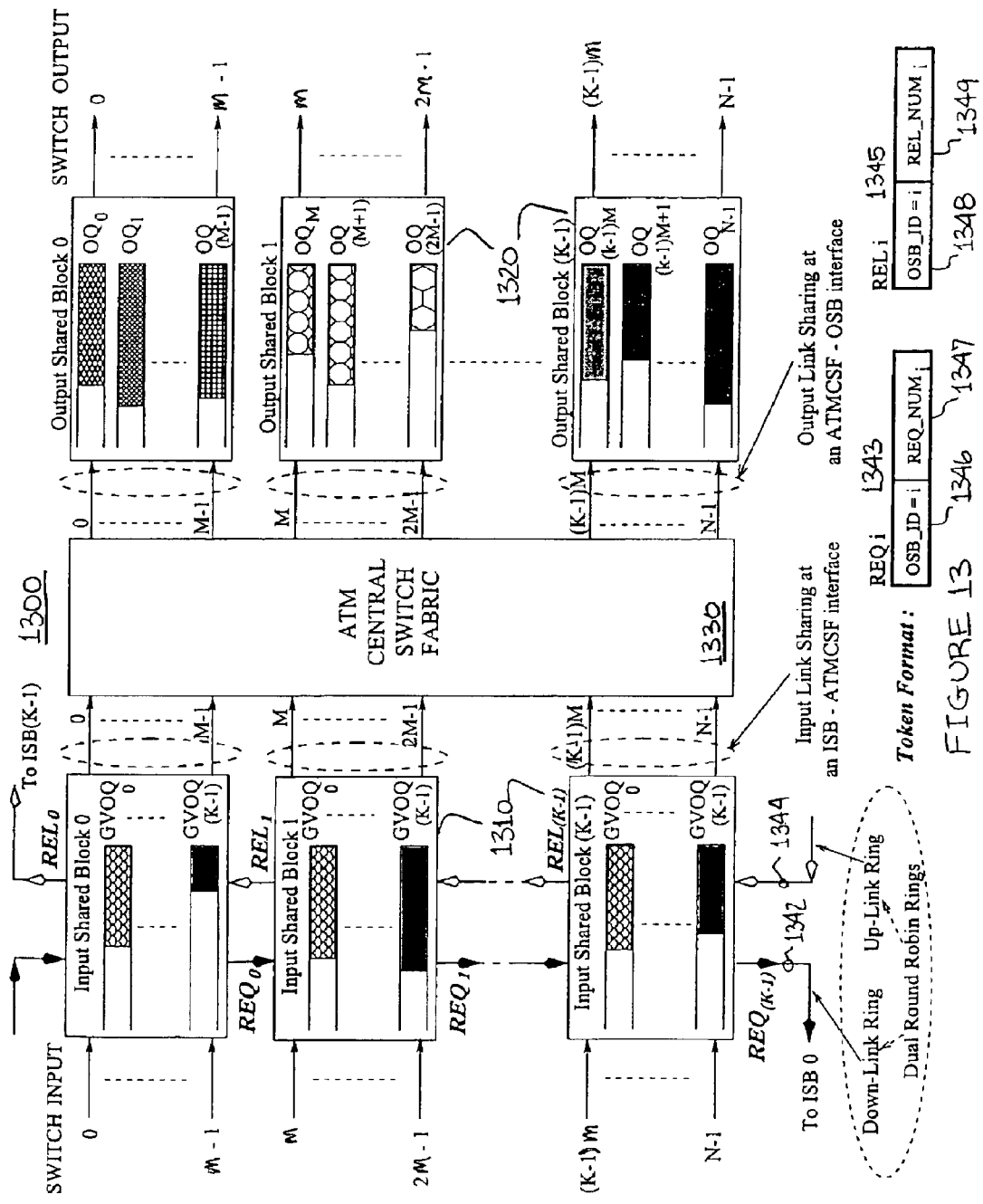

FIG. 13 is a block diagram of a third exemplary switch architecture of the present invention.

Figures 14, 15:
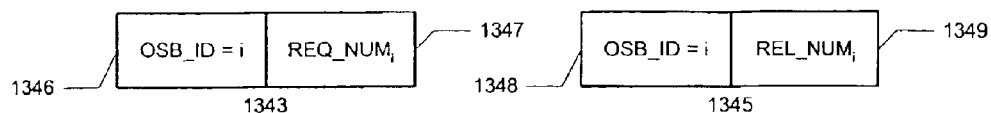
Figure 16:
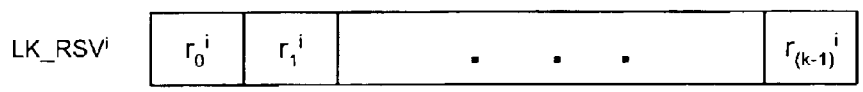

FIGS. 14 and 15 illustrate an exemplary data structure of tokens that may be used in the third switch of FIG. 13.

FIGS. 16 through 19 illustrate exemplary data structures of vectors which may be used by a scheduling method employed by the second switch of FIG. 10 and which may be used by a scheduling method employed by the third switch of FIG. 13.

Figure 20:
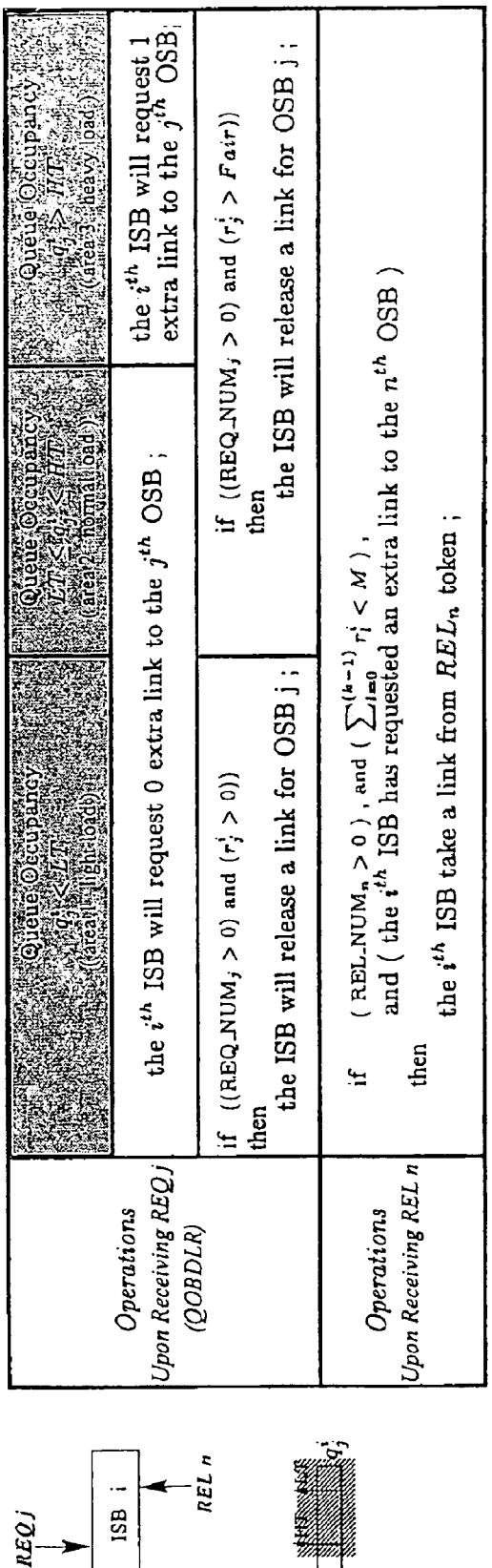

FIG. 20 is a table which illustrates exemplary operations which may be carried out by a first exemplary scheduling method which may be used by the third switch of FIG. 13.

FIG. 21 illustrates state changes that may occur in a request value in the scheduling method illustrated in FIG. 20.

Figure 22:

FIG. 22 illustrates an exemplary data structure of a vector which may be used by a scheduling method employed by the third switch of FIG. 13.

Figure 23:
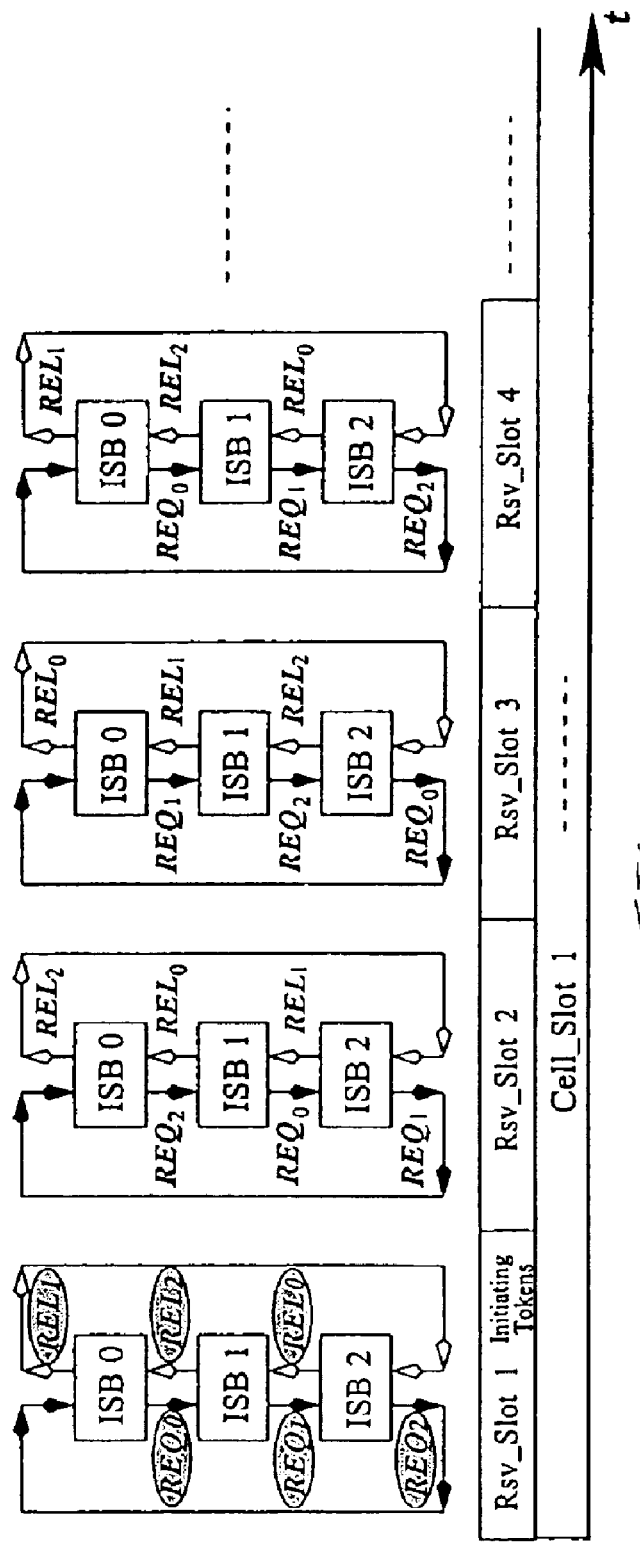

FIG. 23 illustrates an operation of the third switch of FIG. 13.

Figure 24B:
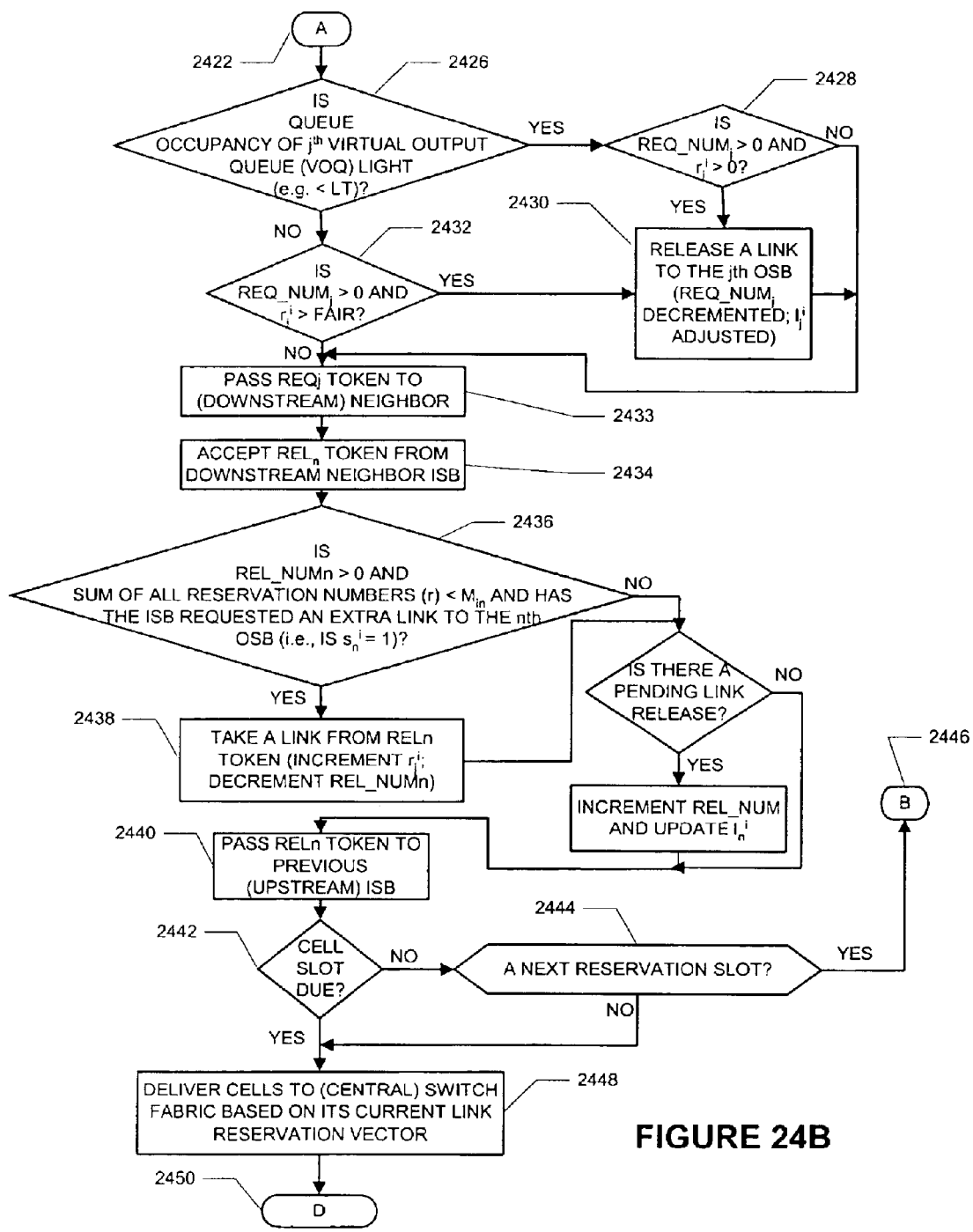

FIG. 24, which includes FIGS. 24A and 24B, is a flow diagram of a scheduling method, such as illustrated in FIG. 20, which may be used by the third switch of FIG. 13.

FIG. 25 is a table which illustrates exemplary operations which may be carried out by a second exemplary scheduling method which may be used by the third switch of FIG. 13.

Figure 26A:
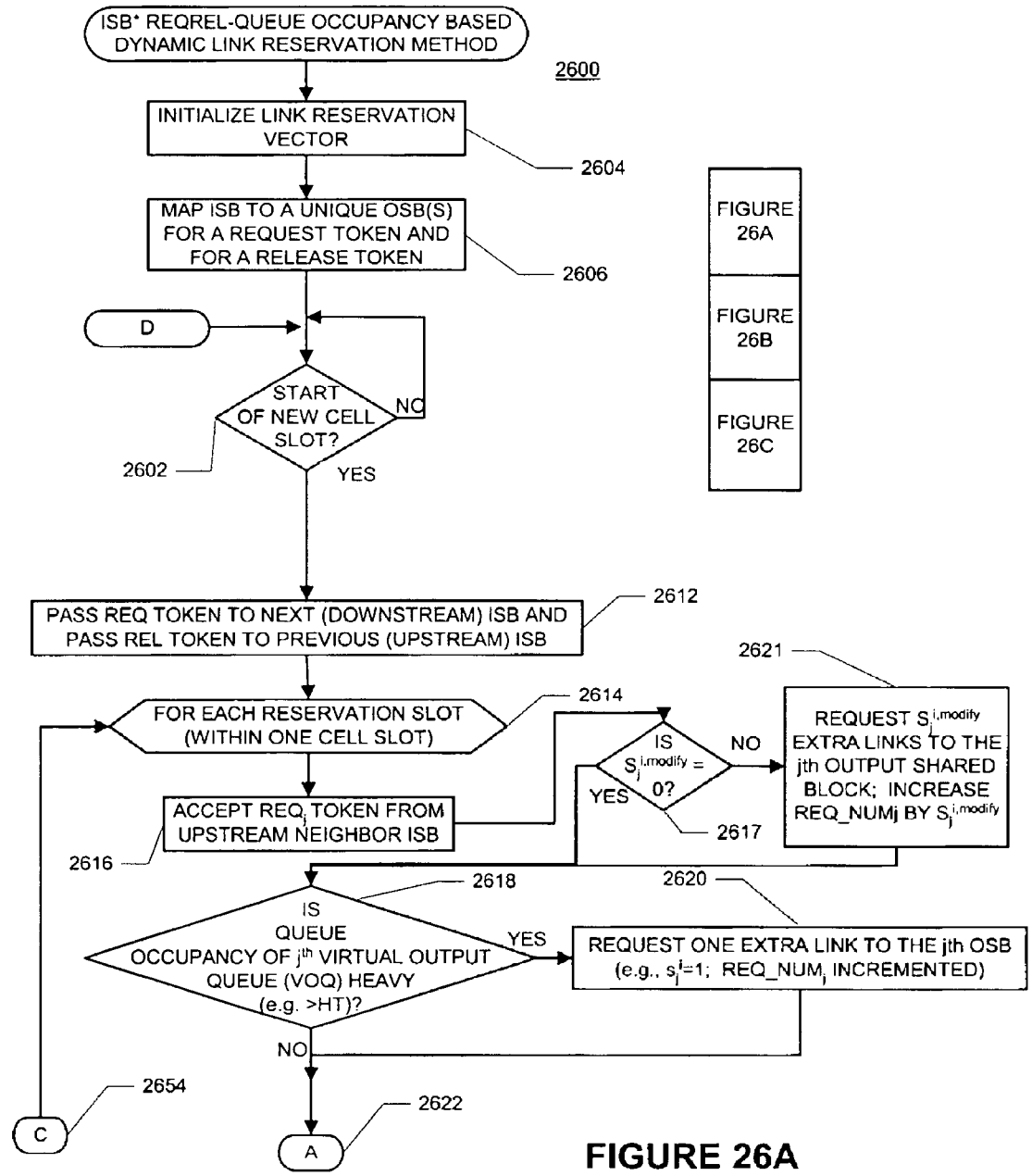
Figure 26B:
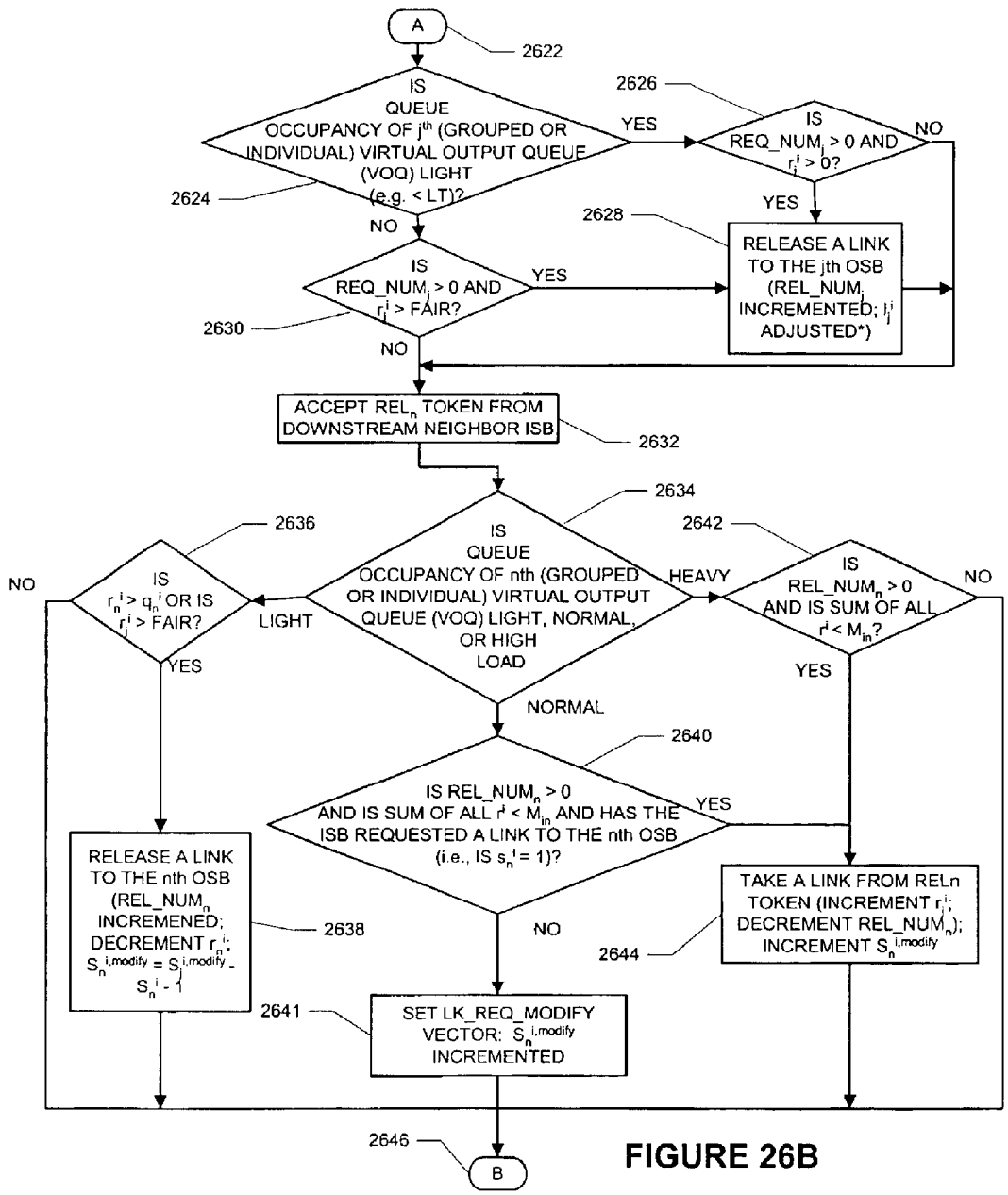
Figure 26C:
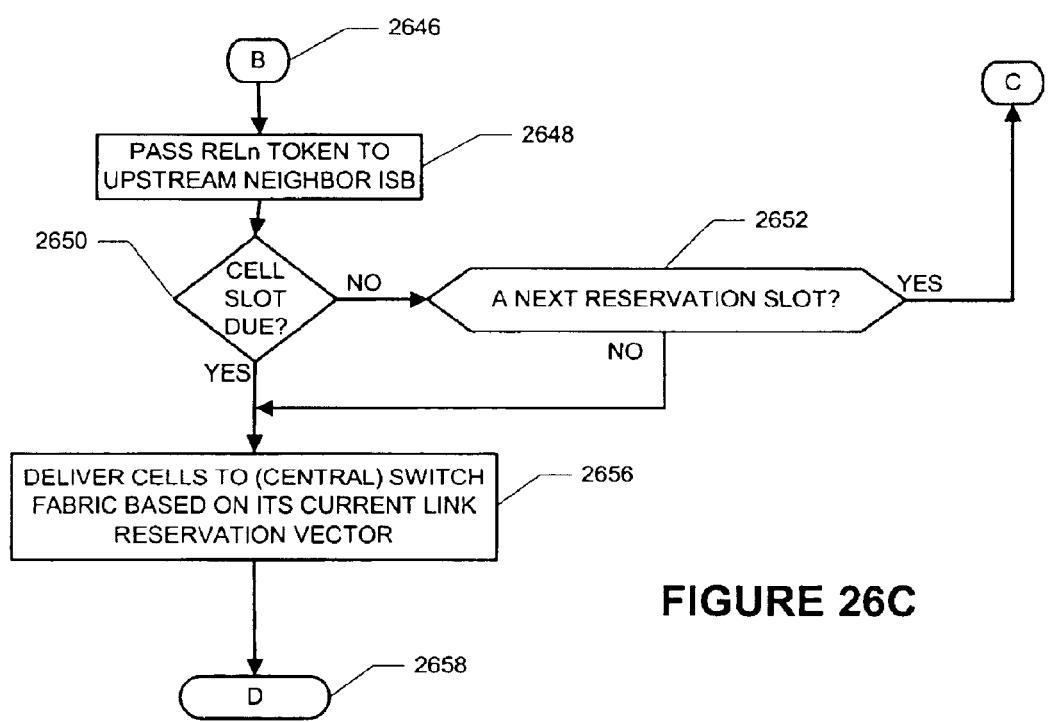

FIG. 26, which includes FIGS. 26A through 26C, is a flow diagram of a scheduling method, such as illustrated in FIG. 25, which may be used by the third switch of FIG. 13.

§ 4. DETAILED DESCRIPTION

The present invention involves novel methods, apparatus and data structures for switching packets. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus and data structures and any other patentable subject matter to the extent that they are patentable.

In the following, functions which may be performed by the present invention are introduced in § 4.1. Then, structures, processes, methods and data structures which may be used to effect those functions are described in § 4.2. Finally, comparisons among the various switches of the present invention and output queued switches are presented in § 4.3.

§ 4.1 Functions which may be Performed by the Present Invention

Basically, the present invention may function to switch packets. More specifically, the present invention may function to schedule packets queued on the input side of a switch. The scheduling techniques permit scaling the switch while maintaining fairness.

§ 4.2 Exemplary Processes, Methods, Apparatus and Data Structures

Three (3) alternative switch architectures and scheduling techniques are described below. The first switch architecture, described in § 4.2.1 below, is a basic switch design using link sharing and round robin (RR) scheduling. It can achieve a good performance under uniform traffic, but has a weakness to support non-uniform traffic relative to the second and third switch architectures.

The second switch architecture, described in § 4.2.2 below, is a modified switch design, which uses link sharing and a round robin prioritized output link reservation (RR+POLR) technique. The second switch architecture alleviates starvation of output shared blocks (OSBs) especially under unbalanced traffic, thereby improving performance. The efficiency of round robin prioritized output link reservation (RR+POLR) technique is determined by how fast the link reservation rate can be obtained in the switch. The round robin prioritized output link reservation (RR+POLR) technique does not ensure that link reservation will timely adapt traffic loads in input shared blocks (ISBs).

The third switch architecture, described in § 4.2.3 below, is an enhanced switch using link sharing and dual round robin dynamic link reservation. A queue occupancy based dynamic link reservation (QOBDLR) arbitration technique provides fast and fair link resource allocation among input shared blocks (ISBs). The performance of the third switch architecture is competitive to output queued (OQ) switches—it not only can achieve a comparable performance to output queued (OQ) switches under any traffic pattern, but also can eliminate the N times speedup of the switching fabric required in output queued (OQ) switches. Both the switch architecture and scheduling technique are scalable.

§ 4.2.1 First Scheduling (Arbitration) Technique

In § 4.2.1.1 below, an exemplary switch architecture and exemplary data structures which may be used with the first scheduling technique are described. Then the first scheduling technique is described in § 4.2.1.2 below. The first switch architecture uses input and output link sharing to achieve a scalable multicast packet switch. Link sharing with a round robin scheduling algorithm resolves output contention and eliminates speedup in the central switch fabric (although speedup can be implemented). Fairness is guaranteed.

§ 4.2.1.1 Exemplary Switch Architecture and Data Structures

FIG. 4 is a block diagram of the first switch architecture 400. The switch 400 includes three (3) major components: input shared blocks (ISBs) 410; output shared blocks (OSBs) 420; and an ATM central switch fabric (ATMCSF) 430. Switch inputs and outputs are respectively grouped into K input shared blocks (ISB) 410, and K output shared blocks (OSBs) 420, where K=N/m. (Alternatively, the grouping of the inputs and outputs can be different (i.e., $K_{in} \neq K_{out}$).) At every ISB-ATMCSF interface, there are M input links 440 shared by m related switch inputs 450. At every ATMCSF-OSB interface, there are M output links 460 shared by m grouped switch outputs 470. (Again, alternatively, since $K_{in}$ can differ from $K_{out}$, $M_{in}$ can differ from $M_{out}$.) Applying input link sharing and output link sharing together gives the switch 400 a unique design. Having introduced the first switch 400, exemplary input shared blocks (ISBs) 410 are described in § 4.2.1.1.1 below, an exemplary output shared block (OSB) 420 is described in § 4.2.1.1.2 below, and an exemplary switch fabric 430 is described in § 4.2.1.1.3 below.

§ 4.2.1.1.1 Input Shared Blocks

An input shared block (ISB) 410 can be a shared memory receiving multicast cells from m (=M) related switch inputs 450. A multicast cell may be saved once in an input shared block (ISB) 410 instead of keeping j identical cell copies (assume, j is the fanout of a multicast cell, $(1 \leq j \leq N)$). Two alternative schemes for shared memory management in an input shared block (ISB) 410—individual virtual output queues (IVOQs), and grouped virtual output queues (GVOQs)—are illustrated in FIGS. 5 and 6 below.

Figure 5:
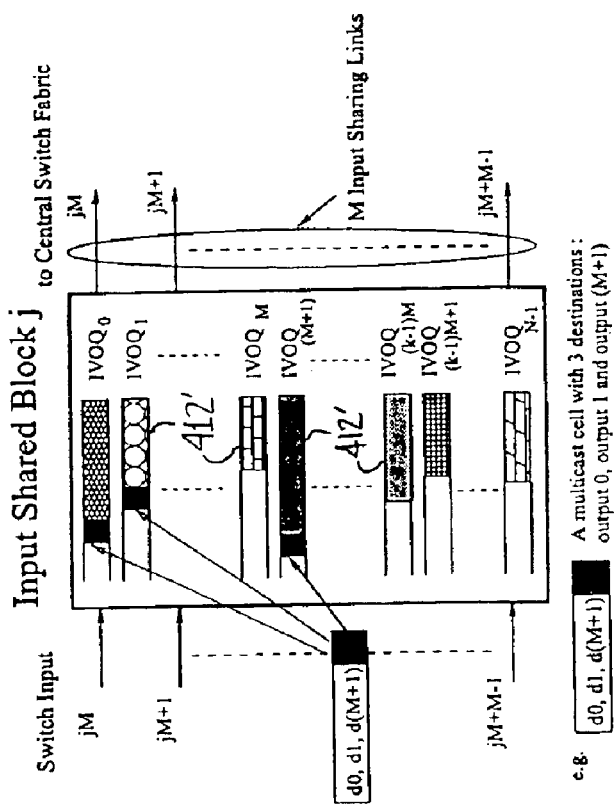
FIG. 5 is a block diagram which illustrates individual virtual output queues in an input shared block.

An individual virtual output queue (IVOQ) scheme is shown in FIG. 5. Like virtual output queues (VOQs) in input-queued (IQ) switches, every input shared block (ISB) 410' keeps N virtual output queues 412'. Each virtual output queue 412' is a linked list of the multicast cells going to a same switch output 470. The physical address to save a multicast cell will be stored into every related linked list. Cell delivery from a virtual output queue is based on a FIFO principle. When a multicast cell has all cell copies delivered, the memory address for this cell will be released and available for a new cell.

Figure 1:
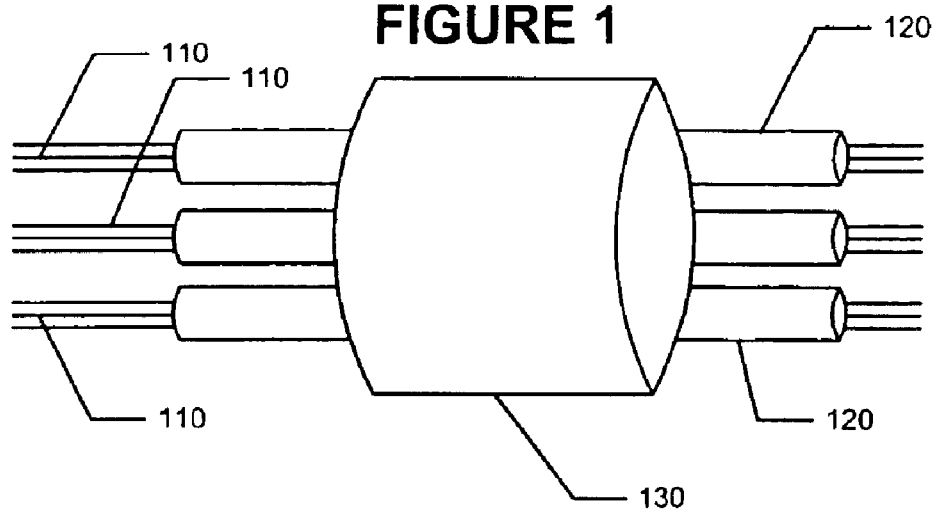
FIG. 1 illustrates virtual channels and paths as defined by the ATM protocol.
Figure 2:
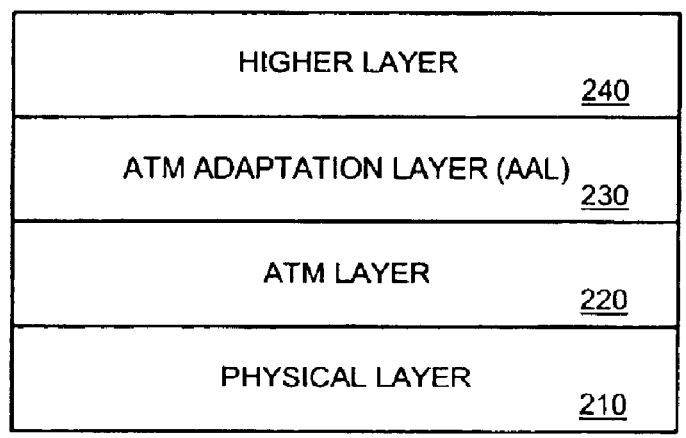
FIG. 2 illustrates the ATM protocol stack.
Figure 3A:
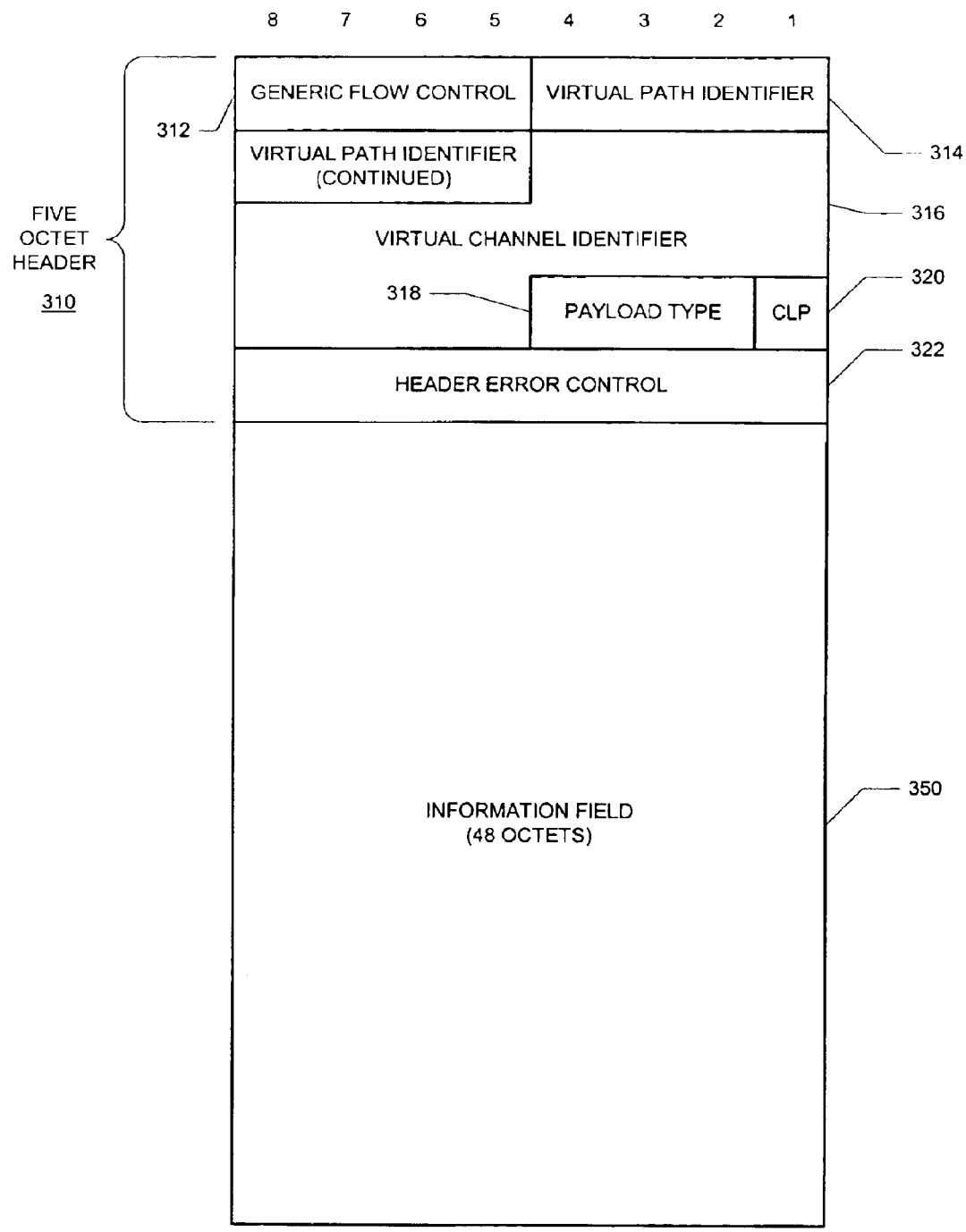
FIGS. 3A and 3B illustrate the format of ATM cells.
Figure 3B:
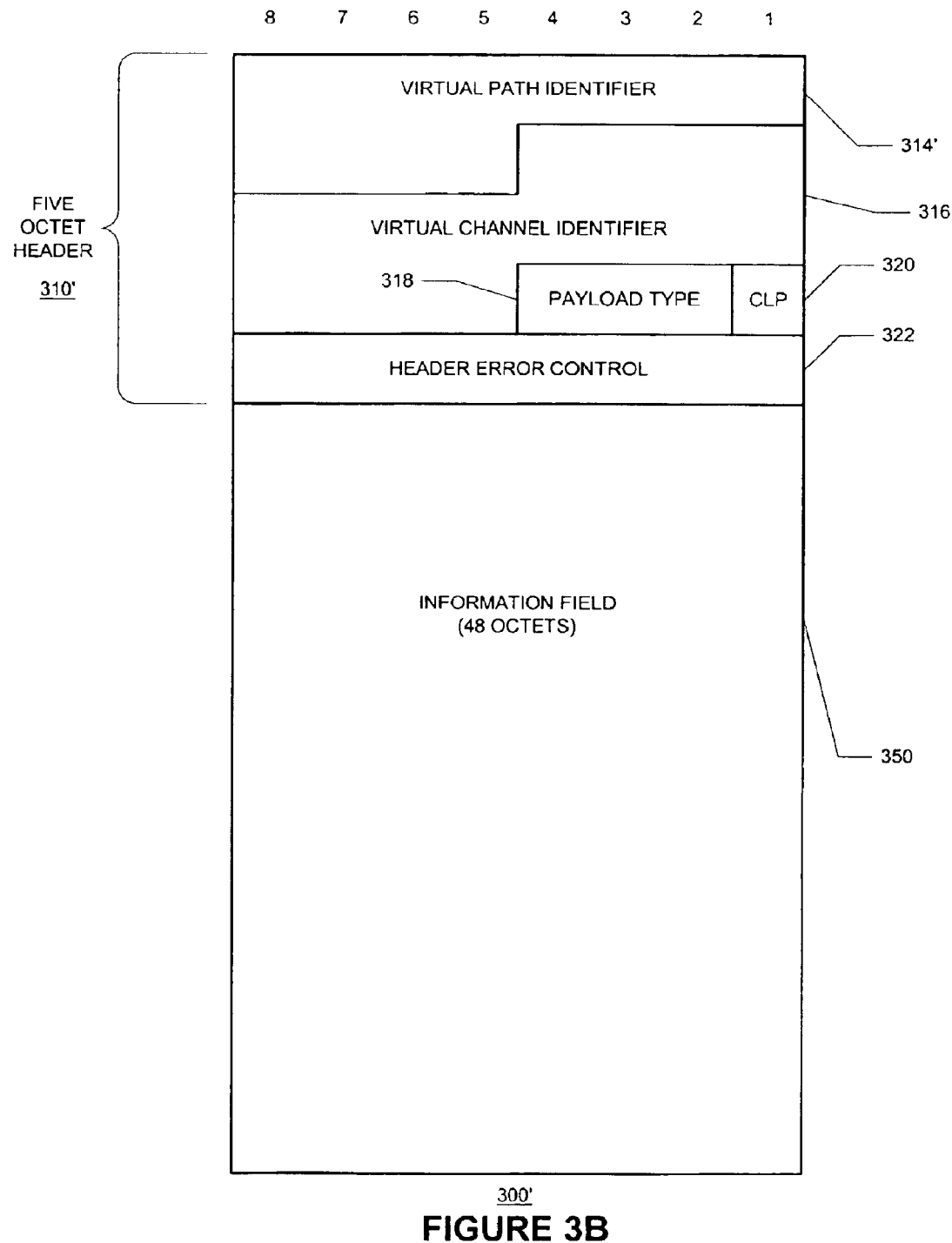
Figure 6:
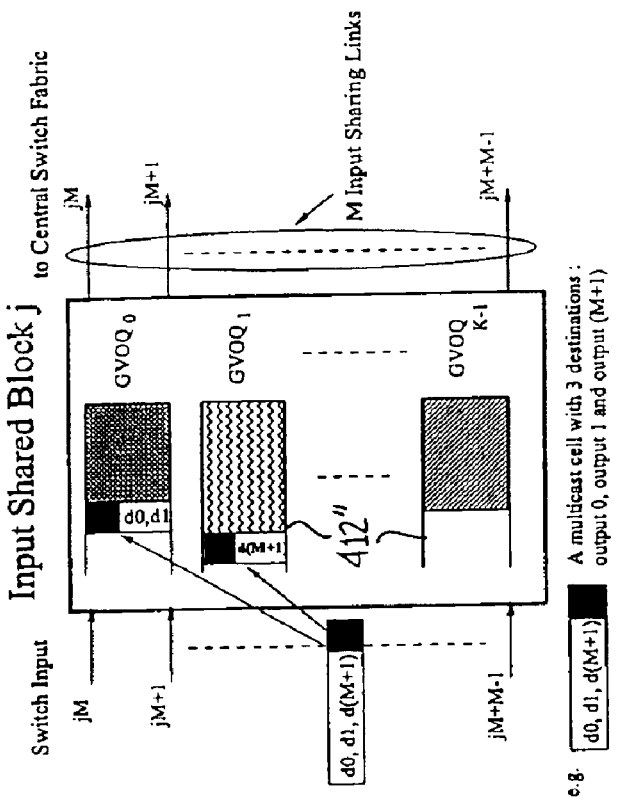
FIG. 6 is a block diagram which illustrates grouped virtual output queues in an input shared block.

A grouped virtual output queue (GVOQ) scheme is shown in FIG. 6. Every input shared block (ISB) 410" only maintains K (=N/m) or (=N/$m_{out}$, if $m_{in} \neq m_{out}$) grouped virtual output queues 412". A grouped virtual output queue 412" is a linked list of the multicast cells targeting an output shared block (OSB) 420. If a multicast cell has more than one destination to an output shared block (OSB) 420, only single connection carrying all desired destinations is attached to the related grouped virtual output queue 412". Hence, a cell delivered from an input shared block (ISB) 410" may carry multiple destinations, and will be stored into every related output queue when the cell is received by an output shared block (OSB) 420. Compared with the switch using individual virtual output queues (IVOQs) 412', the switch with grouped virtual output queues (GVOQs) 412" can forward more cell copies from input shared blocks (ISBs) 410" to output shared blocks (OSBs) because only one copy of the packet (indicating multiple destination output ports) needs to be delivered to an output shared block (OSB) 420 even though it may be destined for more than one output port on that output shared block (OBS) 420. Consequently, it can achieve better performance. The grouped virtual output queue (GVOQ) scheme follows the FIFO principle to receive and deliver cells.

Since an ISB-ATMCSF interface 440 has a capacity of m (or $m_{in}$) links, an input shared block (ISB) 410 can deliver at most m (or $m_{in}$) cells to the central switch fabric 430 in every cell slot. An input shared block (ISB) 410 can send a cell through any of the m (or $m_{in}$) shared links 440. Input link sharing can avoid link starvation if some virtual output queue 412 is empty because other virtual output queues 412 can utilize the idle link to deliver their cells. Input link sharing results in an improved performance.

§ 4.2.1.1.2 Output Shared Blocks

Referring back to FIG. 4, each output shared block (OSB) 420 may be a shared memory containing M (or $M_{in}$ if $M_{in} \neq M_{out}$) output queues 422. In every cell slot, each output queue 422 delivers one cell out from the related switch output. An ATMCSF-OSB interface 460 only supports M (or $M_{out}$) links. Therefore, each output shared block (OSB) 420 can accept at most M (or $M_{out}$) cells from the central switch fabric 430 in every cell slot. The central switch fabric (ATMCSF) 430 can use any of the M (or $M_{out}$) shared links 460 to transmit a cell to an output shared block (OSB) 420. Without output link sharing, if more than one cell goes to a same switch output 470, either cells are blocked, or it is necessary for the switch fabric 430 to speedup. However, output link sharing avoids both problems.

§ 4.2.1.1.3 Central Switch Fabric

The central switch fabric (ATMCSF) 430 should keep the same cell sequence for those cell copies which are delivered from an input shared block (ISB) 410 to an output shared block (OSB) 420. It can be any type of switch fabric (for example, the Abacus switch discussed in the H. J. Chao article) 430, and no speedup is necessary.

§ 4.2.1.2 Exemplary Round Robin Scheduling Technique

Figure 7:
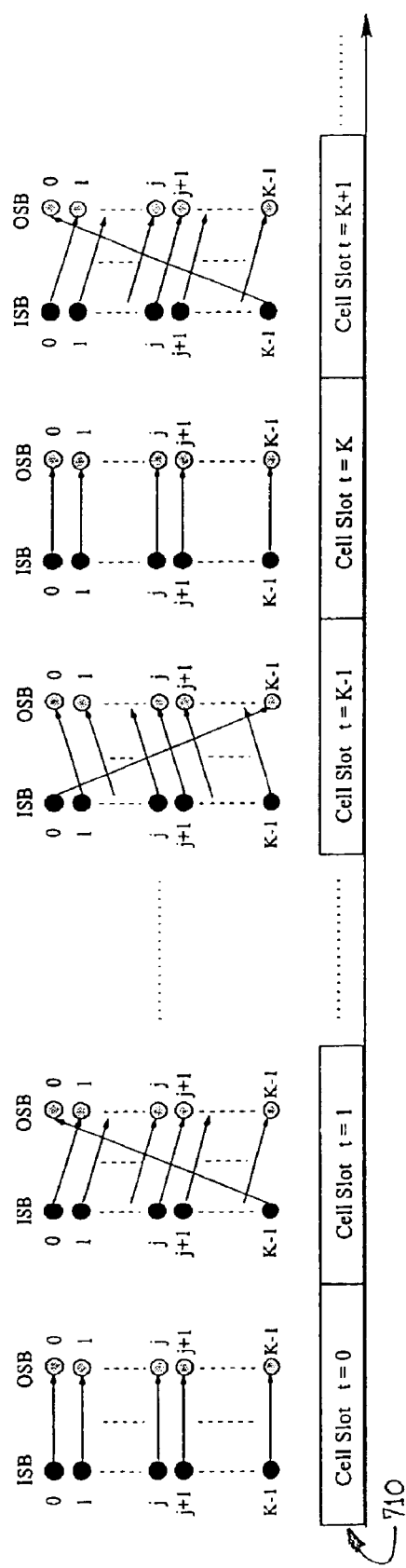
FIG. 7 illustrates an operation of the first exemplary switch.

The first switch architecture 400 may apply a round robin (RR) scheduling algorithm as shown in FIG. 7. In every cell slot 710, there is a one-to-one mapping from the K input shared blocks (ISBs) 410 to the K output shared blocks (OSBs) 420. If $K_{in} \neq K_{out}$, each input shared block (ISB) 410 is mapped to $$\frac{K_{out} \times M_{out}}{K_{in}}$$

links at the ATMCSF-OSB interface. Each input shared block (ISB) 410 is responsible for delivering, at most, M (or $M_{out}$) cells to its matched output shared block (OSB) 420. Round robin mapping ensures that an input shared block (ISB) 410 has the opportunity to send cells to every output shared block (OSB) 420 in every K cell slots 710. In this way, fairness among input shared blocks (ISBs) 410 is guaranteed. Since either individual virtual output queues (IVOQs) 412' or grouped virtual output queues (GVOQs) 412" are employed in every input shared block (ISB) 410, two (2) scheduling algorithms—(IVOQ) Round Robin and (GVOQ) Round Robin are described below with reference to FIGS. 8 and 9, in §§ 4.2.1.2.1 and 4.2.1.2.2, respectively.

§ 4.2.1.2.1 Individual Virtual Output Queue (IVOQ) Round Robin

FIG. 8 is a block diagram which illustrates the individual virtual output queue (IVOQ) round robin (RR) scheme. Every input shared block (ISB) 410' divides its N individual virtual output queues 412' into K (or $K_{out}$) subgroups. Each subgroup has M (or $M_{out}$) virtual output queues 412' which are associated with a certain output shared block (OSB) 420. According to the one-to-one mapping in current cell slot 710, an input shared block (ISB) 410' delivers cells from a subgroup of M (or $M_{out}$) virtual output queues to its associated output shared block (OSB) 420. The head-of-line (HOL) cells from the selected M virtual queues 412' are sent to central switch fabric 430. If any polled virtual output queue 412' is empty, other virtual output queues 412' in the same subgroup can deliver more than one cell. Hence, input link sharing can avoid link starvation. Scheduling complexity is in the range of [O(1) to O(M)]. It is possible that more than one cell may go to the same switch output. Output link sharing is used to avoid internal cell loss and eliminate speedup in the central switch fabric 430. Note that if $m_{in} < M_{in}$ and/or $m_{out} < M_{out}$, then speedup may be implemented. In addition, the switch fabric 430 should keep the same cell sequence for those cells delivered from an input shared block (ISB) 410 to an output shared block (OSB) 420.

§ 4.2.1.2.2 Grouped Virtual Output Queue (IVOQ) Round Robin

FIG. 9 is a block diagram which illustrates the grouped virtual output queue (GVOQ), round robin (RR) scheme. In every cell slot, an input shared block (ISB) 410" only inquires a single grouped virtual output queue 412" and delivers the first M cells, if any, to its matched output shared block (OSB) 420. Scheduling complexity is O(1). Using grouped virtual output queues (GVOQs) 412" in input shared blocks (ISBs) 410" benefits cell delivery, especially for multicast traffic, because a cell delivered from a grouped virtual output queue (GVOQ) 412" may carry multiple destinations to the matched output shared block (OSB) 420.

Consequently, a faster cell forwarding from input shared blocks (ISBs) 410″ to output shared blocks (OSBs) 420 results. The grouped virtual output queue (GVOQ) round robin (RR) scheme may block a cell going to an idle switch output while sending more than one cell to a switch output.

§ 4.2.1.3 Remarks on the First Switch Architecture and Scheduling Technique

The first switch architecture 400 can achieve a comparable performance to the output queued (OQ) switch under uniform traffic. However, the first switch architecture does not perform as well under non-uniform traffic. This is because although the round robin technique is fair, it simply does not account for traffic non-uniformities. Increasing the size of the input and output shared blocks (ISBs and OSBs) 410 and 420 or choosing M>m (which indicates speedup of the central switch fabric) leads to better performance. Compared with the IVOQ RR, the GVOQ RR scheme results in higher throughput and less cell delay especially under multicast traffic. This is because the GVOQ RR scheme forwards cells to output shared blocks (OSBs) 420 in a faster manner than the IVOQ RR scheme.

The first switch advantageously has a modular switch architecture and employs distributed cell scheduling. The first switch also benefits from input link sharing and output link sharing. Essentially, speedup of the switching fabric 430 is not necessary. Round robin scheduling algorithms (i.e., IVOQ RR and GVOQ RR) provide a distributed mechanism to resolve output contention. Fairness for switch inputs is guaranteed. Scheduling complexity of the IVOQ RR scheme is O(M), while it is O(1) for the GVOQ RR scheme. Compared with the centralized schedulers with a complexity of at least $O(N^{2.5})$ proposed for input-queued (IQ) switches in the articles: N. Mckeown, V. Anantharam, J. Walrand, "Achieving 100% Throughput in an Input-Queued Switch," *Proc. of IEEE INFOCOM96*, (March 1996); A. Mekkittikul, N. McKeown, "A Starvation-free Algorithm For Achieving 100% Throughput in an Input-Queued Switch," *Proc. of ICCCN96*, (1996); A. Mekkittikul, N. Mckeown, "A Practical Scheduling Algorithm to Achieve 100% Throughput in Input-Queued Switches," *Proc. of IEEE INFOCOM98*, (April 1998); S-T. Chuang, A. Goel, N. Mckeown, B. Prabhakar, "Matching Output Queuing with Combined Input/Output-Queued Switch," *IEEE J. on Select. Areas in Commun.*, Vol. 17, No. 6, pp. 1030–1039 (June 1999); and. B. Prabhakar, N. Mckeown, R. Ahuja, "Multicast Scheduling for Input-Queued Switches," *IEEE J. on Select. Areas in Commun.*, Vol. 6, (May 1996), cell scheduling in the first switch architecture is much simpler. Both switch architecture and scheduling algorithm ensure high scalability.

§ 4.2.2 Second Scheduling (Arbitration) Technique

The second switch architecture uses link sharing and prioritized link reservation. Unlike the first switch architecture 400, here the input shared blocks (ISBs) are linked together through a token ring. Cell delivery in every cell slot is based on link reservation(s) in input shared blocks (ISBs). In a cell slot, the second switch architecture still uses a round robin scheme to achieve a one-to-one mapping from K input shared blocks (ISBs) to K output shared blocks (OSBs). Each input shared block (ISB) has the highest priority to reserve as many links as possible to its mapped output shared block (OSB). If an input shared block (ISB) can not fully occupy the M links to its mapped output shared block (OSB), the input shared block (ISB) will issue a token to inform other input shared blocks (ISBs) that idle links remain at the specific ATMCSF-OSB interface. Therefore, other input shared blocks (ISBs) can reserve and utilize the remaining links to transmit their cells to the output shared block (OSB). Starvation of output shared blocks (OSBs) is alleviated. The second switch architecture outperforms the first switch architecture, especially under non-uniform traffic.

§ 4.2.2.1 Exemplary Switch Architecture and Data Structures

FIG. 10 is a block diagram of the second switch architecture 1000. This switch 1000 includes K input shared blocks (ISBs) 1010, a central switch fabric (ATMCSF) 1030, K output shared blocks (OSBs) 1020, and a token ring 1040. Alternatively, the number of input shared blocks (ISBs) 1010 need not be the same as the number of output shared blocks (OSBs) 1020 (i.e., $K_{in} \neq K_{out}$). The functions of input shared blocks (ISBs) 1010, output shared blocks (OSBs) 1020 and central switch fabric (ATMCSF) 1030 are the same as those in the first switch architecture 400. Since using grouped virtual output queues (GVOQs) is a more cost-efficient scheme than using individual virtual output queues (IVOQs), the exemplary second switch architecture 1000 illustrated here uses grouped virtual output queues (GVOQs) in each input shared block (ISB) 1010. The input shared blocks (ISBs) 1010 are connected by a token ring 1040 on which K (or $K_{out}$) tokens 1042 circulate in a round robin manner. Each token 1042 is related to a specific output shared block (OSB) 1020. For example, Token$_j$ 1042 is associated with the $j^{th}$ output shared block (OSB) ($0 \leq j \leq K-1$). As shown in FIG. 10, a token 1042 has two (2) fields. The "OSB_ID" field 1044 identifies an output shared block (OSB) 1020 with which the token 1042 is associated. The "Num_Lk_Idle" field 1046 records the number of available links (or alternatively, the number of links already reserved) at the identified ATMCSF-OSB interface. Actually, the value (of field 1044) need not be carried by the tokens 1042. Rather, they can be centrally initialized and then tracked by each input shared block (ISB) 1010.

Figure 17:
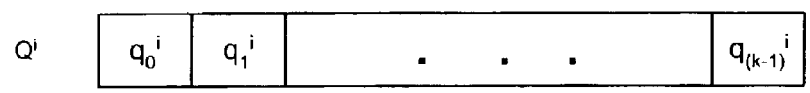
Figure 18:
Figure 19:

§ 4.2.2.2 Exemplary Round Robin Prioritized Output Link Reservation Scheduling Technique In a cell slot, an input shared block (ISB) 1010 can deliver cells to all output shared blocks (OSBs) 1020. However, every input shared block (ISB) 1010 should make a link reservation(s) in advance to obtain the desired links at the targeted ATMCSF-OSB interfaces. Each input shared block (ISB) 1010 has a "link reservation vector" (See FIG. 16.) and a "queue occupancy vector" (See FIG. 17.). The terms $LK\_RSV^i$ and $Q^i$ are used to represent the two vectors in the $i^{th}$ "input shared block (ISB)" ($0 \leq i \leq K$, $0 \leq j \leq K-1$). More specifically, the term $LK\_RSV^i$ is a link reservation vector in the $i^{th}$ ISB. As shown if FIG. 16, $LK\_RSV^i = (r^i_0, r^i_1, \ldots, r^i_{(K-1)})$, where $r^i_j$ indicates how many links at the $j^{th}$ ATMCSF-OSB interface are reserved by the $i^{th}$ ISB, and where $0 \leq r^i_j \leq M$. The term $Q^i$ is a queue occupancy vector in the $i^{th}$ (ISB). As shown in FIG. 17, $Q^i = (q^i_0, q^i_1, \ldots q^i_{(K-1)})$, where $q^i_j$ is the queue length (# of cells) of the $j^{th}$ GVOQ in the $i^{th}$ ISB, and where $q^i_j \geq 0$.

When a cell slot is due, each input shared block (ISB) 1010 delivers cells to the central switch fabric 1030 according to its current link reservation. For example, if the link reservation vector of the $i^{th}$ input shared block (ISB) 1010 ($LK\_RSV^i$) is presently ($r^i_0 = 2, r^i_1 = 0, \ldots, r^i_{(K-1)} = 4$), the $i^{th}$ input shared block (ISB) 1010 will send two (2) cells to OSB 0 and four (4) cells to OSB (K-1), but no cells are scheduled to be sent from the $i^{th}$ input shared block (ISB) 1010 to other output shared blocks (OSBs) 1020. Link reservation is performed according to a round robin prioritized output link reservation (RR+POLR) technique.

FIG. 11, which includes FIGS. 11A and 11B, is a high level flow diagram of an exemplary round robin prioritized output link reservation method. The link reservation vector (LK_RSV$^i$) in every input shared block (ISB) 1010 is reset to zero when a new cell slot starts as shown in steps 1105 and 1110. The second switch architecture 1000 may use the round robin (RR) scheme used in the first switch 400 to obtain a one-to-one mapping from K input shared blocks (ISBs) 1010 to K output shared blocks (OSBs) 1020 in every cell slot as shown in step 1115. If $K_{in} \neq K_{out}$, then each input shared block (ISB) will map to less or more than one output shared block (OSB). The output shared block (OSB) 1020 mapped to an input shared block (ISB) 1010 is called that input shared block's (ISB's) "Master-OSB". Each input shared block (ISB) 1010 has the highest priority to reserve as many links as possible to its Master-OSB as indicated in step 1120. If an input shared block (ISB) 1010 does not fully occupy the M links to its Master-OSB, a token carrying available links for this output shared block (OSB) 1020 will be issued by the input shared block (ISB) 1010 as shown in step 1125. Tokens pass through the input shared blocks (ISBs) 1010 one-by-one, in a round robin manner. Step 1130 indicates that a token 1042 is passed downstream. Alternatively, tokens 1042 can be passed upstream. When an input shared block (ISB) 1010 receives a token which indicates available links to an output shared block (OSB) 1020, the input shared block (ISB) 1010 can reserve as many links as possible (i.e., as are needed and available) to the identified output shared block (OSB) 1020 as shown in steps 1140, 1145, 1150 and 1155. If the input shared block (ISB) 1010 does reserve one or more links to the output shared block (OSB) 1020 identified in the token 1042 (Recall field 1044.), the value of the NUM_LK_IDLE field 1046 is revised to reflect the reserved links as shown in step 1160. The token 1042 is then passed to the next input shared block (ISB) 1010 as shown in step 1170.

The round robin prioritized output link reservation (RR+POLR) technique is performed in every cell slot. FIG. 12 illustrates an example about the link reservation in the cell slot 0. A cell slot (Cell_Slot) 1210 will typically contain multiple reservation slots 1215, each of which is called a Rsv_Slot. In a reservation slot (Rsv_Slot) 1215, an input shared block (ISB) 1010 receives a token 1042 and may make a link reservation to a particular output shared block (OSB) 1020 if such links are available and needed. The fact that multiple reservation slots 1215 may occur within a cell slot 1210 is illustrated in steps 1175 and 1180.

In the first reservation slot (Rsv_Slot) 1215 of every cell slot 1210, according to the one-to-one mapping, an input shared block (ISB) 1010 has the highest priority to reserve as many links as possible to its Master-OSB. Link reservation in an input shared block (ISB) 1010 may be determined by queue occupancy of the related grouped virtual output queue (GVOQ):

$$\text{for } \forall i \in [0, K-1], r^i_{Master-OSB} = \begin{cases} M & \text{if } q^i_{Master-OSB} \geq M \\ q^i_{Master-OSB} & \text{if } q^i_{Master-OSB} < M \end{cases}$$

After reserving links to its Master-OSB, every input shared block (ISB) 1010 initiates a token 1042 about its own Master-OSB, and fills in the "Num_Lk_Idle" field 1046 to record how many links to its Master-OSB are still available. Then, every input shared block (ISB) 1010 passes its newly generated token to the neighboring input shared block (ISB) 1010 next (downstream) or, alternatively, upstream, on the token ring 1040. So far, K tokens 1042 are generated and start circulating on the token ring 1040. A token 1042 passes one input shared block (ISB) 1010 in every reservation slot (Rsv_Slot) 1215.

In the $n^{th}$ (n>1) reservation slot (Rsv_Slot) 1215 of the same cell slot 1210, every input shared block (ISB) 1010 will receive a token from its neighboring input shared block (ISB) 1010 before (upstream of) it (or, alternatively, downstream from it) on the token ring 1040. If the received token 1042 carries available links, an input shared block (ISB) 1010 checks the queue occupancy of the related grouped virtual output queue (GVOQ) and reserves as many links as possible (i.e., as are needed and available) to the identified output shared block (OSB) 1020. (Recall steps 1150 and 1155.) The total links reserved in an input shared block (ISB) 1010 should not exceed M $$\left( \text{i.e., } \sum_{j=0}^{K-1} r^j_i \leq M \text{ for } \forall i \in [0, K-1] \right).$$

The value of the "Num_Lk_Idle" field 1046 in the token 1042 will (may) be reduced by the number of links occupied by the input shared block (ISB) 1010. (Recall step 1160.) At the end of the $n^{th}$ reservation slot (Rsv_Slot) 1215, every input shared block (ISB) 1010 will (may) pass its received token to next (downstream) input shared block (ISB) 1010. (Recall step 1170.)

When a cell slot 1210 is due (that is, at the end of a cell slot 1210), every input shared block (ISB) 1010 delivers cells to the central switch fabric 1030 based on its current link reservation vector as shown in step 1185. In the meantime, all existing tokens 1042 in current cell slot 1210 will be destroyed by input shared blocks (ISBs) 1010 as shown in step 1190. Note that the link reservation rate (i.e., Rsv_Slot) is independent of a cell scheduling cycle (i.e., Cell_Slot), usually Rsv_Slot<<Cell_Slot. If K*Rsv_Slot≦Cell_Slot, a token 1042 can completely cycle the ring in a cell slot 1210. Otherwise, a token 1042 only goes through some, but not all, input shared blocks (ISBs) 1010 in a cell slot 1210.

When a new cell slot 1210' starts, each input shared block (ISB) 1010 resets its link reservation vector. (Recall step 1110.) According to the one-to-one mapping in the new cell slot 1210', an input shared block (ISB) 1010 resumes link reservation with the highest priority from its new Master-OSB. Round robin mapping ensures that an input shared block (ISB) 1010 treats every output shared block (OSB) 1020 as its Master-OSB in every K cell slots. Thus, fairness in the round robin prioritized output link reservation (RR+POLR) technique is guaranteed.

Compared with the first switch architecture, 400, the second switch architecture 1000 provides a mechanism to alleviate starvation of output shared blocks (OSBs) 1020, thereby improving performance, especially under non-uniform traffic. When (K*Rsv_Slot/Cell_Slot)≦1 (i.e., when a token 1040 can completely cycle the ring in a cell slot 1210)), the round robin prioritized output link reservation (RR+POLR) technique can lead to a comparable performance as an output-queued (OQ) switch.

As was the case with the first switch 400, the second switch 1000 enjoys a modular switch architecture. The second switch 1000 also benefits from input and output link sharing. Hence, no speedup is necessary in central switch fabric 1030. Note however, that if $m_{in} < M_{in}$ and/or $m_{out} < M_{out}$, then speedup may be implemented. The round robin prioritized output link reservation (RR+POLR) technique resolves input and output contention. Cell scheduling is determined by link reservation in every input shared block (ISB) 1010. The round robin prioritized output link reservation (RR+POLR) technique is a distributed resource allocation scheme, in which an input shared block (ISB) 1010 makes a link reservation(s) for an output shared block (OSB) 1020 according to queue occupancy of the related grouped virtual output queue (GVOQ). Arbitration complexity is O(1). Accordingly, this switch architecture and scheduling technique enjoy unlimited scalability in theory.

§ 4.2.3 Third Scheduling (Arbitration) Technique

The third switch architecture employs link sharing and dual round robin dynamic link reservation. Unlike the previous two (2) switches 400 and 1000, input shared blocks (ISBs) are connected by dual rings on which K (or $K_{out}$) link request tokens (REQs) and K (or $K_{out}$) link release tokens (RELs) circulate in a round robin manner. Cell delivery is based on link reservation in every input shared block (ISB). Without resetting its link reservation vector in every cell slot, an input shared block (ISB) can dynamically increase and/or decrease its link reservation for a specific output shared block (OSB) by "borrowing" and/or "lending" links from/to other input shared blocks (ISBs) through request tokens (REQs) and release tokens (RELs), respectively. Queue occupancy based dynamic link reservation (QOBDLR) techniques may be used to achieve a fast and fair link resource allocation among input shared blocks (ISBs). The queue occupancy based dynamic link reservation (QOBDLR) techniques are a distributed link reservation schemes in a way that every input shared block (ISB) utilizes its local available information to decide a modification for its own link reservation(s). Arbitration complexity is O(1). The third switch can achieve a comparable performance to output queued (OQ) switches under any traffic pattern.

§ 4.2.3.1 Exemplary Switch Architecture and Data Structures

FIG. 13 is a block diagram of a third switch architecture 1300. This third switch 1300 includes K input shared blocks (ISBs) 1310, central switch fabric (ATMCSF) 1330, K output shared blocks (OSBs) 1320, and dual round robin rings 1342 and 1344. The input shared block (ISB) 1310, output shared block (OSB) 1320 and central fabric switch (ATMCSF) 1330 in the third switch 1300 function the same as those in the first and second switches 400 and 1000. However, in the third switch 1300, the input shared blocks (ISBs) 1310 are connected by dual round robin rings 1342 and 1344. A downward flowing ring 1342 conveys link request tokens (REQs) 1343 and an upward flowing ring 1344 carries link release tokens (RELs) 1345. (In an alternative embodiment, the REQ tokens 1343 can be carried on an upward flowing ring and the REL tokens 1345 can be carried on a downward flowing ring.) At any time, there are K REQ tokens 1343 and K REL tokens 1345 circulating on the dual rings 1342 and 1344, respectively. Every output shared block (OSB) 1320 (e.g., the $i^{th}$ OSB) is correlated with a REQ token (e.g., $REQ_i$) 1343 and a REL token (e.g., $REL_i$) 1345.

Each of the REQ token 1343 and REL token 1345 contains two (2) fields as shown in FIG. 13 through 15. The "OSB_ID" field 1346/1348 identifies an output shared block (OSB) 1320 associated with the token 1343/1345. Actually, these values (of fields 1346 and 1348) need not be carried by the tokens 1343 and 1345. Rather, they can be centrally initialized and then tracked by each input shared block (ISB) 1310. The "REQ_NUM" field 1347 indicates how many link requests are issued for the identified output shared block (OSB) 1320. The "REL_NUM" field 1349 indicates the number of released links which are available at the related ATMCSF-OSB interface.

§ 4.2.3.2 Exemplary Queue Occupancy Based Dynamic Link Reservation Scheduling Techniques Like the second switch 1000, cell delivery is based on link reservation. Every input shared block (ISB) 1310 (e.g., the $i^{th}$ ISB) has a link reservation vector (e.g., $LK\_RSV^i$) and a queue occupancy vector (e.g., $Q^i$) (Recall FIGS. 16 and 17.) In every cell slot, an input shared block (ISB) 1310 delivers cells to the central switch fabric 1330 according to its current link reservation vector.

However, unlike the second switch 1000, the input shared blocks (ISBs) in the third switch 1300 do not need to reset their link reservation vectors in every cell slot 1210. An input shared block (ISB) 1310 can dynamically modify its link reservation for a specific output shared block (OSB) 1320 when the input shared block (ISB) 1310 receives the related REQ token 1343 or REL token 1345.

Link reservation in input shared blocks (ISBs) 1310 endures two (2) contentions. First, K (or $K_{out}$) grouped virtual output queues (GVOQs) in an input shared block (ISB) 1310 contend for M (or $M_{in}$) links at the ISB-ATMCSF interface. Second, K input shared blocks (ISBs) 1310 contend for M (or $M_{out}$) links at every ATMCSF-OSB interface. To achieve an efficient link resource allocation among the input shared blocks (ISBs) 1310, a queue occupancy based dynamic link reservation (QOBDLR) scheme may be used.

The K REQ tokens 1343 and K REL tokens 1345 circulate on the dual rings 1342 and 1344, respectively, passing input shared blocks (ISBs) 1310 one by one in a round robin manner. Recall from FIG. 12 that a cell slot (Cell_Slot) 1210 will typically include multiple reservation slots (Rsv_Slots) 1215. In the third switch 1300, a reservation slot (Rsv_Slot) 1215 is defined as a small time interval during which an input shared block (ISB) 1310 receives a REQ token 1343 (e.g., from an upstream neighbor) and a REL token 1345 (e.g., from a downstream neighbor). In a reservation slot (Rsv_Slot) 1215, an input shared block (ISB) 1310 has the authority to modify its link reservation vector (LK_RSV for the two (2) output shared blocks (OSBs) 1320 which are identified by the received REQ and REL tokens 1343 and 1345, respectively. The reservation slot (Rsv_Slot) 1215 is independent from the cell slot (Cell_Slot) 1210, usually, Rsv_Slot<<Cell_Slot. When a cell slot is due, every input shared block (ISB) 1310 delivers cells to the central switch fabric (ATMCSF) 1330 according to its current link reservation vector.

The queue occupancy based dynamic link reservation (QOBDLR) technique is performed in every reservation slot (Rsv_Slot) 1215. As shown in the simplified illustration of FIG. 23, the $i^{th}$ input shared block (ISB) ($0 \leq i \leq K-1$) is receiving $REQ_j$ token 1343 and $REL_n$ token 1345 in the current reservation slot (Rsv_Slot) 1215. Usually, the $REQ_j$ token 1343 and $REL_n$ token 1345 identify two (2) different output shared blocks (OSBs) 1320 (i.e., usually j≠n). The $i^{th}$ input shared block (ISB) 1310 will only modify its link reservation (i.e., $r^i_j$ and $r^i_n$), for the $j^{th}$ output shared block (OSB) 1320 and the $n^{th}$ output shared block (OSB) 1320 in current reservation slot (Rsv_Slot) 1215.

Two approaches—a REQ-QOBDLR technique and REQREL-QOBDLR technique are presented in §§ 4.2.3.2.1 and 4.2.3.2.2, respectively, below.

§ 4.2.3.2.1 Exemplary REQ-Queue Occupancy Based Dynamic Link Reservation Scheduling Technique An exemplary REQ queue occupancy based dynamic link reservation scheduling technique is now described with reference to FIGS. 13, 20, 24A and 24B.

In general, when receiving a REQ token 1343, an input shared block (ISB) 1310 will check the occupancy of the virtual output queue associated with the output shared block (OSB) 1320 with which the REQ token 1343 is associated. If that virtual output queue is heavily occupied, the input shared block (ISB) 1310 may request an additional link(s) to the output shared block (OSB) 1320. If the virtual output queue is lightly occupied, the input shared block (ISB) 1310 may release links. Finally, if the virtual output queue is not lightly occupied, the input shared block (ISB) 1310 may release links if it has reserved more than its "fair" share. More specifically, when receiving a REQ$_j$ token 1343, the i$^{th}$ input shared block (ISB) 1310 may evaluate its queue occupancy q$^i_j$ against two (2) thresholds: a high threshold (HT) and a low threshold (LT). Then, the i$^{th}$ input shared block (ISB) 1310 may decide whether to request an extra link and/or whether to release a link to the j$^{th}$ output shared block (OSB) 1320. (See, e.g., FIG. 20 and steps 2416, 2418, 2420, 2426, 2428, 2430 and 2432 of FIG. 24.)

More specifically, dynamic link reservation achieved in the REQ-QOBDLR technique is invoked by link requests. When receiving a REQ$_j$ token 1343, the i$^{th}$ input shared block (ISB) 1310 estimates the queue occupancy q$^i_j$ and arbitrates whether to request an extra link and/or to release a link to the j$^{th}$ output shared block (OSB) 1320. However, when receiving the REL$_n$ token 1345, the i$^{th}$ input shared block (ISB) 1310 does not evaluate the queue occupancy q$^i_n$ but just grabs a released link if the input shared block (ISB) 1310 had issued a link request and has been waiting for an available link. (See, e.g., FIG. 20 and steps 2434, 2436 and 2438 of FIG. 24B.) The advantage of REQ-QOBDLR algorithm is that it ensures that input shared blocks (ISBs) 1310 can "borrow" link and "lend" links from each other when necessary.

The details of an exemplary REQ-queue occupancy based dynamic link reservation (REQ-QOBDLR) technique are now described. Every input shared block (ISB) may have following four (4) vectors, $0 \leq i < K$, $0 \leq j < K$:

The term LK_RSV$^i$ denotes a link reservation vector (See FIG. 16.) in the i$^{th}$ input shared block (ISB). LK_RSV$^i = (r_0^i, r_1^i, \ldots, r_{(k-1)}^i)$, where r$^i_j$ indicates how many links at the ATMCSF-OSB j interface are reserved by the i$^{th}$ input shared block (ISB), $0 \leq r^i_j < M$, $0 \leq i < K-1$.

The term Q$^i$ denotes a queue occupancy vector (See FIG. 17.) in the i$^{th}$ input shared block (ISB). Q$^i = (q_0^i, q_1^i, \ldots, q_{(k-1)}^i)$, where q$^i_j$ is the queue occupancy of the j$^{th}$ grouped virtual output queue (GVOQ) in the i$^{th}$ input shared block (ISB), where q$^i_j \geq 0$.

The term LK_REQ$^i$ denotes a link request vector (See FIG. 18.) in the i$^{th}$ input shared block (ISB). LK_REQ$^i = (s_0^i, s_1^i, \ldots, s_{(k-1)}^i)$, where s$^i_j$ indicates whether the i$^{th}$ input shared block (ISB) is requesting a link to the j$^{th}$ output shared block (OSB), s$^i_j = 0$ or 1. If s$^i_j = 0$, the i$^{th}$ input shared block (ISB) is not desiring any more links to the j$^{th}$ output shared block (OSB); if s$^i_j = 1$, the i$^{th}$ input shared block (ISB) is requesting an extra link to the j$^{th}$ output shared block (OSB).

The term LK_REL$^i$ denotes a link release vector (See FIG. 19.) in the i$^{th}$ input shared block (ISB). LK_REL$^i = [l_0^i, l_1^i, \ldots, l_{(k-1)}^i]$, where l$^i_j$ indicates whether the i$^{th}$ input shared block (ISB) has a pending released link for the j$^{th}$ output shared block (OSB), l$^i_j = 0$ or 1.

The REQ-queue occupancy based dynamic link reservation (REQ-QOBDLR) technique is performed in every reservation slot (Rsv_Slot) 1215. Assume that the i$^{th}$ input shared block (ISB) 1310 is receiving a REQ$_j$ token 1343 and REL$_n$ token 1345 (j≠n) in the current reservation slot (Rsv_Slot) 1215.

Referring to FIGS. 13, 20, and 24 (which includes FIGS. 24A and 24B) when receiving REQ$_j$ token 1343, the i$^{th}$ input shared block (ISB) 1310 will evaluate its queue occupancy q$^i_j$ against two (2) thresholds: a high threshold (HT); and a low threshold (LT). Then, the i$^{th}$ input shared block (ISB) 1310 decides whether to request an extra link and/or release a link to the j$^{th}$ output shared block (OSB) 1320. (See, e.g., steps 2418, 2420, 2426, 2428, 2430, and 2432 of FIG. 24.)

Regarding the i$^{th}$ input shared block's (ISB's) 1310 decision of whether to request an additional link for the j$^{th}$ output shared block (OSB) 1310, if q$^i_j$>HT, then the i$^{th}$ input shared block (ISB) 1310 will request an extra link to the j$^{th}$ output shared block (OSB) 1320. (See, e.g., steps 2418 and 2420 of FIG. 24A.) If q$^i_j \leq$ HT, then the i$^{th}$ input shared block (ISB) 1310 should not ask for any more links because the j$^{th}$ grouped virtual output queue (GVOQ) is not heavy loaded.

If the i$^{th}$ input shared block (ISB) 1310 decides to request an additional link to the j$^{th}$ output shared block (OSB) 1320, s$^i_j$ in link request vector LK_REQ$^i$ will be set to 1. The term s$^{i,old}_j$ is used to represent the old value of s$^i_j$ just before the arbitration, and the term s$^i_j$ is used to present the updated value after arbitration in current reservation cycle (Rsv_Cycle) 1215. As shown in FIG. 21, there are four (4) possible circumstances according to the values of q$^i_j$ and s$^{i,old}_j$. In case 1, the i$^{th}$ input shared block (ISB) 1310 generates a new link request which will be inserted into the REQ_NUM$_j$ field 1347 as discussed below. In case 2, the i$^{th}$ input shared block (ISB) 1310 had already sent a link request but has not obtained the desired link yet. In case 3, the i$^{th}$ input shared block (ISB) 1310 will keep waiting for an available link but will not issue a new link request again. In case 4, the i$^{th}$ input shared block (ISB) 1310 will cancel its current link request if the value of the REQ_NUM$_j$ field 1347 is greater than zero (REQ_NUM$_j$>0).

Regarding the i$^{th}$ input shared block's (ISB's) 1310 decision of whether to release a link if token carries link requests, if the number in the REQ_NUM$_j$ field 1347 is greater than zero (REQ_NUM$_j$>0), REQ$_j$ token 1343 carries link requests for the j$^{th}$ output shared block (OSB) 1320. The i$^{th}$ input shared block (ISB) 1310 will evaluate its queue occupancy q$^i_j$ to decide whether to release a link for the j$^{th}$ output shared block (OSB) 1320. If q$^i_j$<LT, then the i$^{th}$ input shared block (ISB) 1310 will unconditionally release one of its reserved links to the j$^{th}$ output shared block (OSB) 1320. (See, e.g., steps 2426, 2428, and 2430 of FIG. 24B.) If q$^i_j \geq$LT, the i$^{th}$ input shared block (ISB) 1310 will release a link for the j$^{th}$ output shared block (OSB) if the input shared block (ISB) 1310 occupies more than a "fair" number of links to the j$^{th}$ output shared block (OSB) 1320 (i.e., r$^i_j$>Fair). (See, e.g., steps 2426, 2432, and 2430 of FIG. 24B.) The value in the REQ_NUM$_j$ field 1347 will be reduced by 1 if the i$^{th}$ input shared block (ISB) 1310 decides to release a link to the j$^{th}$ output shared block (OSB) 1320.

Usually, the i$^{th}$ input shared block (ISB) 1310 can not utilize the REL$_n$ token 1345 to pass a released link for the j$^{th}$ output shared block (OSB), if j≠n. Therefore, the i$^{th}$ input shared block (ISB) 1310 does not need to reduce its link reservation r$^i_j$ in current reservation slot (Rsv_Slot) 1215, even though it decides to release a link for the j$^{th}$ output shared block (OSB) 1320. The i$^{th}$ input shared block (ISB) 1310 only needs to reduce the value in the REQ_NUM$_j$ field 1347 by 1, and records this pending link release for the j$^{th}$ output shared block (OSB) 1320 in l$^i_j$. This pending link release will be activated when the i$^{th}$ input shared block (ISB) 1310 receives a REL$_j$ token 1345 later, as follows:

$$l_j^i = \begin{cases} 1 & \text{if } ((q_j^i < LT) \text{ and } (r_j^i > 0)) \\ 1 & \text{if } ((q_j^i \geq LT) \text{ and } (r_j^i > Fair)) \\ 0 & \text{otherwise} \end{cases}$$

The $i^{th}$ input shared block (ISB) updates the $REQ_j$ token 1343, then passes the $REQ_j$ token 1343 to next downstream input shared block (ISB).

If a newly generated link request for the $j^{th}$ output shared block (OSB) 1320 was generated by the $i^{th}$ input shared block (ISB) 1310 above (Recall case 1 in FIG. 21), then the $i^{th}$ input shared block (ISB) 1310 will (may) insert this new request in the $REQ_j$ token 1343. Hence, the value in the $REQ\_NUM_j$ field 1347 will be increased by 1. (Recall step 2420 of FIG. 24.) Finally, the $i^{th}$ input shared block (ISB) 1310 forwards a $REQ_j$ token 1343 to its downstream, adjacent, input shared block (ISB) 1310. (See, e.g., step 2433 of FIG. 24.)

Still referring to FIGS. 13, 20 and 24, when receiving a $REL_n$ token 1345, the $i^{th}$ input shared block (ISB) 1310 will decide whether to take a link from the $REL_n$ token 1345 if the $REL_n$ token 1345 carries available links.

First, the $i^{th}$ input shared block (ISB) 1310 decides whether to take an available link from the $REL_n$ token 1345. If the value in the $REL\_NUM_n$ field 1349>0, the $REL_n$ token 1345 accommodates available links to the $n^{th}$ output shared block (OSB) 1320. If the $i^{th}$ input shared block (ISB) 1310 has sent a link request for the $n^{th}$ output shared block (OSB) 1320 before (i.e., $s_n^i=1$) and if the total links reserved by the input shared block (ISB) 1310 is less than M $$\left(\text{i.e.}, \sum_{i=0}^{(K-1)} r_i^i < M\right),$$

then the $i^{th}$ input shared block (ISB) 1310 will reserve an available link from the $REL_n$ token 1345. (See, e.g., steps 2436 and 2438 of FIG. 24B.) More specifically, if the $i^{th}$ input shared block (ISB) 1310 can grab a link from $REL_n$ token 1345, its link reservation $r_n^i$ will be increased by 1, but the value in the $REL\_NUM_n$ field 1349 will be reduced by 1.

The $i^{th}$ input shared block (ISB) 1310 then updates the $REL_n$ token 1345, then passes the $REL_n$ token 1345 to its upstream neighboring input shared block (ISB) 1310. (See, e.g., step 2440 of FIG. 24B.)

If the $i^{th}$ input shared block (ISB) 1310 held a pending link release for the $n^{th}$ output shared block (OSB) 1320 (i.e., $l_n^i=1$), now, the $i^{th}$ input shared block (ISB) 1310 can really release the link for the $n^{th}$ output shared block (OSB) 1320 through the $REL_n$ token 1345. The $i^{th}$ input shared block (ISB) 1310 reduces $r_n^i$ by 1, and increases the value of the $REL\_NUM_n$ field 1349 by 1. Finally, the $i^{th}$ input shared block (ISB) 1310 passes the $REL_n$ token 1345 to its upstream neighboring input shared block (ISB) 1310.

Cell delivery and link reservation are independent operations. When a Cell_Slot 1210 is due, every input shared block (ISB) 1310 sends cells to the central switch fabric (ATMCSF) 1330 based on its current link reservation vector. (See, e.g., steps 2442 and 2448 of FIG. 24B.) However, an input shared block (ISB) 1310 can modify its link reservation in every reservation slot (Rsv_Slot) 1215. Usually, Rsv_Slot 1215<Cell_Slot 1210.

Notice that although the link reservation vector of each input shared block (ISB) 1310 is initialized such that, for example the expression $$\sum_{i=0}^{K-1} r_i^i = M$$

is satisfied. (See step 2404.) For example, $r_1^i$ may be set to the "fair" parameter value. Each input shared block (ISB) 1310 is mapped to a unique (e.g., the $j^{th}$) output shared block (OSB) 1320 via a request token 1343 and a unique (e.g., the $n^{th}$) output shared block (OSB) 1320 via a release token 1345 (See step 2406.), these values are not "reset" with each new cell slot. The values in the REQ_NUM and REL_NUM fields may be initialized to zero (0).

The REQ-QOBDLR technique may not operate optimally when the switch size is very large, because the queue occupancy $q_n^i$ may have changed while the $i^{th}$ input shared block (ISB) 1310 is waiting for a preferred link to the $n^{th}$ output shared block (OSB) 1320. It is possible that, when receiving a $REL_n$ token 1345 in a current reservation slot (Rsv_Slot) 1215, the $i^{th}$ input shared block (ISB) 1310 desires an additional link to the $n^{th}$ output shared block (OSB) 1320 (i.e., if $q_n^i$>HT) but it has not issued any link request for the $n^{th}$ output shared block (OSB) 1320 before. It is always possible that the $i^{th}$ input shared block (ISB) 1310 currently does not need the extra link even though it has sent out a link request. These events are increasingly possible as K increases. One solution is to have the $i^{th}$ input shared block (ISB) 1310 evaluate queue occupancy $q_n^i$ when it handles a $REL_n$ token 1345. In the REQREL-QOBDLR technique, described in § 4.2.3.2.2 below, updating of both $r_j^i$ and $r_n^i$ for $REQ_j$ and $REL_n$ tokens 1343 and 1345, respectively, is based on queue occupancy $q_j^i$ and $q_n^i$.

Although in the exemplary method, each of the output shared blocks (OSBs) 1320 only had one associated request token 1343 and release token 1345, in an alternative embodiment, each output shared block (OSB) 1320 can have more than one associated request token 1343 and release token 1345.

§ 4.2.3.2.2 Exemplary REQREL-Queue Occupancy Based Dynamic Link Reservation Scheduling Technique Link reservation in an input shared block (ISB) 1310 is more likely to adapt the real traffic load, because an input shared block (ISB) 1310 has two (2) opportunities in a Ring_Cycle to modify its link reservation to a specific output shared block (OSB) 1320. Link request and link release are arbitrated as dynamic link reservation is achieved as a combined arbitration. In the REQREL-QOBDLR co technique, link reservation in an input shared block (ISB) 1310 for a specific output shared block (OSB) 1320 can more quickly adapt to the traffic load, because the queue occupancy based dynamic link reservation is also employed in the operation for REL token 1345.

Details of a particular implementation of the REQREL-QOBDLR technique are described later. In this section, the basic steps of REQREL-QOBDLR technique are presented. As shown in FIG. 23, the $i^{th}$ input shared block (ISB) 1310 is receiving $REQ_j$ and $REL_n$ tokens in a current reservation slot (Rsv_Slot) 1215. For the received $REQ_j$ token 1343, the $i^{th}$ input shared block (ISB) 1310 does the same operation as the REQ-QOBDLR technique. That is, the $i^{th}$ input shared block (ISB) 1310 will evaluate the queue occupancy $q_j^i$ to arbitrate a potential modification of $r_j^i$. A difference from the REQ-QOBDLR technique exists in the operation of the input shared block (ISB) 1310 upon receiving a $REL_n$ token 1345. Rather than just taking an available link from $REL_n$ token 1345, if the input shared block (ISB) 1310 has requested a link for the $n^{th}$ output shared block (OSB) 1320, the $i^{th}$ input shared block (ISB) 1310 will also estimate the queue occupancy $q^i_n$ to decide an intended modification of $r^i_n$.

When receiving the $REQ_j$ token 1343, the $i^{th}$ input shared block (ISB) 1310 performs similar operations as those performed under the REQ-QOBDLR technique.

When receiving a $REL_n$ token 1345, the $i^{th}$ input shared block (ISB) 1310 may (i) determine whether to release a link based on queue occupancy (of the VOQ associated with the $n^{th}$ output shared block (OSB) 1320), number of links reserved (to the $n^{th}$ output shared block (OSB) 1320), and a "fairness" parameter, and (ii) determine whether or not to take a released link based on queue occupancy (of the VOQ associated with the $n^{th}$ output shared block (OSB) 1320), the number of links reserved (to the $n^{th}$ output shared block (OSB) 1320), and the M value. More specifically, the input shared block (ISB) 1310 will (may) evaluate its queue occupancy $q^i_n$ with the high and low thresholds (HT and LT) to decide an intended modification on $r^i_n$.

As shown in FIG. 25, if $q^i_n$>HT, then the $i^{th}$ input shared block (ISB) 1310 may grab an additional link for the $n^{th}$ output shared block (OSB) 1320 as long as following conditions hold: (1) the $REL_n$ token 1345 carries available links (i.e., REL_NUM$_n$>0); and (2) the total number of links reserved by the $i^{th}$ input shared block (ISB) 1310 is less than M $$\left(\text{i.e.,} \sum_{l=0}^{(K-1)} r^i_l < M\right).$$

(See, e.g., steps 2634, 2642 and 2644 of FIG. 26B.)

As shown in FIG. 25, if LT≦$q^i_n$≦HT, then the $i^{th}$ input shared block (ISB) 1310 will take an extra link for the $n^{th}$ output shared block (OSB) 1320 if following requirements are satisfied: (1) the $REL_n$ token 1345 carries available links (i.e., REL_NUM$_n$>0); (2) the input shared block (ISB) 1310 has requested a link for the output shared block (OSB) 1320; and (3) the total number of links reserved by the input shared block (ISB) 1310 is smaller than M $$\left(\text{i.e.,} \sum_{l=0}^{(K-1)} r^i_l < M\right).$$

(See, e.g., steps 2634, 2640 and 2642 of FIG. 26B.)

If $q^i_n$<LT, then the $i^{th}$ input shared block (ISB) 1310 may schedule a link release if its current reservation for the $n^{th}$ output shared block (OSB) 1320 is either greater than a "Fair" number (i.e., $r^i_n$>Fair) or greater than its current queue occupancy (i.e., $r^i_n$>$q^i_n$). (See, e.g., steps 2634, 2636 and 2638 of FIG. 26B.)

If $q^i_n$>HT, it may happen that the $i^{th}$ input shared block (ISB) 1310 takes a link from the $REL_n$ token 1345 but it had not sent a link request before. Under such circumstance, the $i^{th}$ input shared block (ISB) 1310 is referred to as a "thieving ISB", which "steals" an available link that may have been released for a link request issued by another input shared block (ISB) 1310, namely the "victim ISB". The "victim ISB" that has sent a link request and is waiting for an available link may never receive its desired link if there is a "thieving ISB" on the way grabbing an available link from $REL_n$ token 1345. To address this issue, the "thieving ISB" should send a link request for the $n^{th}$ output shared block (OSB) 1320 to motivate a link release, not for itself but for the "victim ISB". Usually, this compensated link request for the $n^{th}$ output shared block (OSB) 1320 cannot be inserted into $REQ_j$ token 1345 in the current reservation slot (Rsv_Slot) 1215. The input shared block (ISB) 1310 has to record this pending link request and wait for receiving the $REQ_n$ token 1343 to send this link request to other input shared blocks (ISBs) 1310.

If $q^i_n$<LT, the $i^{th}$ input shared blocks (ISBs) 1310 releasing a link for the $n^{th}$ output shared block (OSB) 1320 is due to its own low traffic load and it does not need to be triggered by link requests in the $REQ_n$ token 1343. Thus, the $i^{th}$ input shared block (ISB) 1310 may release a link for the $n^{th}$ output shared block (OSB) 1320 without any knowledge of how many link requests are indicated in the $REQ_n$ token 1343. To utilize links efficiently, REL_NUM≦REQ_NUM$_n$. That is, all available links will be used up by link requests and will be needed by some input shared blocks (ISBs) 1310. Considering this, when the $i^{th}$ input shared block (ISB) 1310 releases a link for the $n^{th}$ output shared block (OSB) 1320 due to $q^i_n$<LT, there are actually (REQ_NUM$_n$-1) or (REQ_NUM$_n$-2) link requests that are expecting available links for the $n^{th}$ output shared block (OSB) 1320. More specifically, if the $i^{th}$ input shared block (ISB) 1310 has not sent a link request for the $n^{th}$ output shared block (OSB) 1320, then (REQ_NUM$_n$-1) link requests are demanding available links after the $i^{th}$ input shared block (ISB) 1310 releases a link. If, on the other hand, the $i^{th}$ input shared block (ISB) 1310 has issued a link request for the $n^{th}$ output shared block (OSB) 1320, then (REQ_NUM$_n$-2) link requests are demanding available links after the $i^{th}$ input shared block (ISB) 1310 releases a link. Hence, the $i^{th}$ input shared block (ISB) 1310 should decrease REQ_NUM$_n$ 1347 by either 1 or 2. However, the $i^{th}$ input shared block (ISB) 1310 does not hold the REQ$_n$ token 1343 in the current reservation slot (Rsv_Slot) 1215. The $i^{th}$ input shared block (ISB) 1310 records this pending reduction of link requests and waits to receive the REQ$_n$ token 1343 to modify REQ_NUM$_n$ 1347.

Due to operations for the received $REL_n$ token 1345, when the $i^{th}$ input shared block (ISB) 1310 receives the REQ$_n$ token 1345 in some reservation slot(s) (Rsv_Slot(s)) 1215 later, the input shared block (ISB) 1310 first has to update the value in the REQ_NUM$_n$ field 1347 with the pending increment/decrement of link requests for the $n^{th}$ output shared block (OSB) 1320. After that, the value in the REQ_NUM$_n$ field 1347 will realistically reflect the link requests for the $n^{th}$ output shared block (OSB) 1320. From this point forward, the operation for REQ$_n$ token 1343 is exactly the same as that in the REQ-QOBDLR technique.

The details of an exemplary queue occupancy based dynamic link reservation (REQREL-QOBDLR) technique are now described with reference to FIGS. 13, 25 and 26 (which includes FIGS. 26A through 26C). The $i^{th}$ input shared block (ISB) 1310 (0≦i<k) needs another vector, denoted LK_REQ_Modify$^i$ besides the four (4) vectors $Q^i$, LK_RSV$^i$, LK_REL$^i$, and LK_REQ$^i$ already described above.

Referring to FIG. 22, the term LK_REQ_Modify$^i$ denotes a link request modification vector in the $i^{th}$ input shared block (ISB) 1310. LK_REQ_Modify$^i$=($s_0^{i,modify}$, $s_1^{i,modify}$, $s^{i,modify}_{(K-1)}$), where $s^{i,modify}_j$ records the number of link requests that the $i^{th}$ input shared block (ISB) 1310 intends to increase/decrease to the total link requests for the $j^{th}$ output shared block (OSB) 1320. If $s^{i,modify}_j$>0, then the $i^{th}$ input shared block (ISB) 1310 may result in an increase on total link requests for the $j^{th}$ output shared block (OSB) 1320. If $s^{i,modify}_j$<0, link requests for the $j^{th}$ output shared block (OSB) 1320 may be reduced.

Assume that the $i^{th}$ input shared block (ISB) 1310 is receiving $REQ_j$ and $REL_n$ tokens 1343 and 1345, respectively in a current reservation slot (Rsv_Slot) 1215. As stated above, operation for the $REQ_j$ token is similar to that in the REQ-QOBDLR technique. On the other hand, operation for the $REL_n$ token 1345 is unlike that in REQ-QOBDLR technique.

The operation of an input shared block (ISB) 1310 upon receiving a $REL_n$ token 1345 is described first. Then, the impact of such difference in the operation of the $REL_n$ token 1345 on the operation for the $REQ_j$ token 1343 is described.

First, the $i^{th}$ input shared block (ISB) 1310 decides whether to take a released link from the $REL_n$ token 1345, if $REL\_NUM_n>0$. If $REL\_NUM_n>0$, there are available links to the $n^{th}$ output shared block (OSB) 1320. The $i^{th}$ input shared block (ISB) 1310 may take a released link from the $REL_n$ token 1345 if its queue occupancy is greater than the low threshold (i.e., $q^i_n \geq LT$).

If $(LT \leq q^i_n \leq HT)$ and $$\left(\sum_{i=0}^{(K-1)} r^j_i < M\right),$$

then the $i^{th}$ input shared block (ISB) 1310 will take a link from the $REL_n$ token 1345 if it has requested a link to the $n^{th}$ input shared block (ISB) 1310 (i.e., if $s^i_n=1$). (See, e.g., steps 2634, 2640 and 2646 in FIG. 26B.)

If $(q^i_n>HT)$ and $$\left(\sum_{i=0}^{(K-1)} r^j_i < M\right),$$

the $i^{th}$ input shared block (ISB) 1310 will grab a link from the $REL_n$ token 1345 no matter whether or not it has requested a link for the $n^{th}$ output shared block (OSB) 1320 (i.e., $s^i_n=0$ or 1). (See, e.g., steps 2634, 2642 and 2644 of FIG. 26B.)

If the $i^{th}$ input shared block (ISB) 1310 decides to take an available link from the $REL_n$ token 1345, its link reservation $r^i_n$ will increase 1 but the value in the $REL\_NUM_n$ field 1349 will decrease 1.

If, however, $q^i_n>HT$, if the $i^{th}$ input shared block (ISB) 1310 takes an available link from the $REL_n$ token 1345 without sending a request in advance (i.e., if $s^i_n=0$), it implies that the $i^{th}$ input shared block (ISB) 1310 is snatching a link which is supposed to satisfy another input shared block's (ISB's) 1310 link request. To compensate for the "stolen" link, the $i^{th}$ input shared block (ISB) 1310 may issue a link request for the $n^{th}$ output shared block (OSB) 1320 to trigger a new released link not for itself but for another input shared block (ISB) 1310 that is still waiting for its desired link. Since the $i^{th}$ input shared block (ISB) 1310 cannot use the $REQ_j$ token 1343 to carry a link request for the $n^{th}$ output shared block (OSB) 1320 in the current reservation slot (Rsv_Slot) 1215, the input shared block (ISB) 1310 records this pending link request in the LK_REQ_Modify vector (Recall FIG. 22) by setting $s^{i,modify}_n = s^{i,modify}_n + 1$. (See, e.g., steps 2640 and 2641 of FIG. 26B.) As soon as the $i^{th}$ input shared block (ISB) 1310 receives the $REQ_n$ token 1343 in some reservation slot(s) (Rsv_Slot(s)) 1215 later, the $i^{th}$ input shared block (ISB) 1310 will add the pending link request into the $REQ\_NUM_n$ field 1347. (See, e.g., steps 2617 and 2621 of FIG. 26A.)

Next, the $i^{th}$ input shared block (ISB) 1310 decides whether to release an occupied link to the $n^{th}$ output shared block (OSB) 1320. If $(q^i_n<LT)$ and $(r^i_n>0)$, then the $i^{th}$ input shared block (ISB) 1310 will release one of its occupied link(s) to the $n^{th}$ output shared block (OSB) 1320. (See, e.g., steps 2634, 2636, and 2638 of FIG. 26B.)

If the $i^{th}$ input shared block (ISB) 1310 decides to release a link, its link reservation $r^i_n$ will be reduced by 1. The released link will be inserted into $REL_n$ token 1345 right away so that the value in the $REL\_NUM_n$ field 1349 will be increased by 1.

Since the $i^{th}$ input shared block (ISB) 1310 releases a link based on its own traffic load, it does not know whether other input shared blocks (ISBs) 1310 are demanding this available link for the $n^{th}$ output shared block (OSB) 1320. Thus, it would be possible that more links may be released than necessary. To avoid this problem, the $i^{th}$ input shared block (ISB) 1310 should have a way to reduce the total link requests for the $n^{th}$ output shared block (OSB) 1320 if it can release an available link to the $n^{th}$ output shared block (OSB) 1320. That is, if the $i^{th}$ input shared block (ISB) 1310 can release a link for the $n^{th}$ output shared block (OSB) 1320, from a global perspective of the link requests carried in the $REQ_n$ token 1343, only $(REQ\_NUM_n - s^i_j - 1)$ link requests are demanding available links. As the $i^{th}$ input shared block (ISB) 1310 does not have a $REQ_n$ token 1343 in hand in the current reservation slot (Rsv_Slot) 1215, the $i^{th}$ input shared block (ISB) 1310 will record the pending reduction on link requests for the $n^{th}$ output shared block (OSB) 1320 by setting $s^{i,modify}_n = s^{i,modify}_n - s^i_n - 1$. (Recall steps 2640 and 2641 of FIG. 26B.) As soon as the $i^{th}$ input shared block (ISB) 1310 receives a $REQ_n$ token 1343 in some number of reservation slot(s) (Rsv_Slot(s)) 1215 later, the $i^{th}$ input shared block (ISB) 1310 may carry out the intending reduction on the value in the $REQ\_NUM_n$ field 1347 as follows: $REQ\_NUM_n = REQ\_NUM_n + s^{i,modify}_n$. (Recall steps 2617 and 2621 of FIG. 26A.)

Finally, the $i^{th}$ input shared block (ISB) 1310 modifies the $REL_n$ token 1345, and passes it to next upstream input shared block (ISB) 1310. (See, e.g., step 2648.) If the $i^{th}$ input shared block (ISB) 1310 has a record about a pending link release for the $n^{th}$ output shared block (OSB) 1320 (i.e., $l^i_n=1$), the input shared block (ISB) 1310 will really reduce its link reservation $r^i_n$ by 1 in order to release a link for the $n^{th}$ output shared block (OSB) 1320. Then, the $i^{th}$ input shared block (ISB) 1310 will use the $REL_n$ token 1345 to pass the released link to other output shared blocks (OSBs) 1320.

If $l^i_n=1$, then $r^i_n$ reduces 1 and the value of the $REL\_NUM_n$ field is 1349 increased by 1. Finally, the $i^{th}$ input shared block (ISB) 1310 sends the $REL_n$ token 1345 to its upstream input shared block (ISB) 1310.

In REQREL-QOBDLR technique, operations upon receiving a $REQ_j$ token 1343 is very similar to that in REQ-QOBDLR technique. However, before starting the steps shown in REQ-QOBDLR technique, the $i^{th}$ input shared block (ISB) 1310 will first update the value in the $REQ\_NUM_j$ field 1347 with $s^{i,modify}_j$ (i.e., $REQ\_NUM_j = REQ\_NUM_j + s^{i,modify}_j$). Recall steps 2617 and 2621 of FIG. 26A.) This is done because the operations, upon receiving the $REL_j$ token 1345 (which may not be scheduled in current Rsv_Slot), may cause a potential pending increase/decrease on total link requests carried in $REQ_j$ token 1343. Hence, when the $i^{th}$ input shared block (ISB) 1310 receives a $REQ_j$ token 1343 in present, the value of the $REQ\_NUM_j$ field 1347 may be adjusted to be more realistically reflect the number of link requests for the $j^{th}$ output shared block (OSB) 1320. The value of the $REQ\_NUM_j$ field 1347 may be negative. This implies that the available links to the $j^{th}$ output shared block (OSB) 1320 is more than link requests to the $j^{th}$ output shared block (OSB) 1320 at the current time.

A negative value in the REQ_NUM$_j$ field 1347 will not trigger any more link releases for the j$^{th}$ output shared block (OSB) 1320. Hence, from a long-term perspective, the released links for the j$^{th}$ input shared block (ISB) 1310 will keep a balance to the link requests for the j$^{th}$ output shared block (OSB) 1320 (i.e., REL_NUM≦REQ_NUM$_j$). This is a characteristic of the REQREL-QOBDLR technique.

As was the case with the REQ queue occupancy based dynamic link reservation method 2400, Notice that although the link reservation vector of each input shared block (ISB) 1310 is initialized such that, for example the expression $$\sum_{i=0}^{K-1} r_i^j = M$$

is satisfied. (See step 2404.) For example, $r_1^i$ may be set to the "fair" parameter value. Each input shared block (ISB) 1310 is mapped to a unique (e.g., the j$^{th}$) output shared block (OSB) 1320 via a request token 1343 and a unique (e.g., the j$^{th}$) output shared block (OSB) 1320 via a release token 1345 (See step 2406.), these values are not "reset" with each new cell slot. The values in the REQ_NUM and REL_NUM fields may be initialized to zero (0).

Although in the exemplary method, each of the output shared blocks (OSBs) 1320 only had one associated request token 1343 and release token 1345, in an alternative embodiment, each output shared block (OSB) 1320 can have more than one associated request token 1343 and release token 1345.

§ 4.3 Setting Parameters for the Queue Occupancy Based Dynamic Link Reservation Techniques In queue occupancy based dynamic link request (QOBDLR) technique, the high threshold (HT) and the low threshold (LT) are (may be) predefined system parameters (which may or may not change after initialization). In every reservation slot (Rsv_Slot) 1215, each input shared block (ISB) 1310 evaluates its queue occupancy of a grouped virtual output queue (GVOQ) with the high and low thresholds to decide whether to increase or decrease its link reservation for the related output shared block (OSB) 1320. Selecting appropriate values for the high and low thresholds will permit the queue occupancy based dynamic link request (QOBDLR) technique to achieve a fair and fast link resource allocation among input shared blocks (ISBs) 1310.

As mentioned above, input shared blocks (ISBs) 1310 tolerate two (2) contentions when making link reservation to the targeted output shared blocks (OSBs) 1320. First, K grouped virtual output queues (GVOQs) in a same input shared block (ISB) 1310 contend for M (or M$_{in}$) links at the ISB-ATMCSF interface. Second, K input shared blocks (ISBs) 1310 contend for M (or M$_{out}$) links at every ATMCSF-OSB interface.

As shown in FIG. 23, if the aggregated input traffic to the i$^{th}$ input shared block (ISB) (0≦i≦K) uniformly targets K output shared blocks (OSBs) 1320, then queue occupancy of every grouped virtual output queue (GVOQ) in the i$^{th}$ input shared block: (ISB) 1310 will be the same. Hence:

$$q_0^i = q_1^i = \ldots = q_{K-1}^i = \frac{\rho_0^i + \rho_1^i + \ldots + \rho_{M-1}^i}{K} = \frac{1}{K}\sum_{j=0}^{M-1}\rho_j^i$$

where, $\rho_j^i$ (0≦j<K) is the normalized input load contributed by the j$^{th}$ switch input of the i$^{th}$ input shared block (ISB) 1310, (0≦$\rho_j^i$<K). Note that $\rho_j^i$ is a normalized input load of traffic received by the i$^{th}$ input shared block (ISB) 1310 destined for the j$^{th}$ output shared block (OSB) 1320.

If every input shared block (ISB) 1310 sustains the same aggregated input load at any time, then queue occupancy of every grouped virtual output queue (GVOQ) in every input shared block (ISB) 1310 is the same. The term q$_{avg}$ represents the queue occupancy of grouped virtual output queue (GVOQ) under this uniformly balanced traffic scenario. To obtain q$_{avg}$, an equivalent traffic model in which $$\rho \times M = \sum_{j=0}^{M-1} \rho_j^i$$

is (may be) used. That is, it is (may be) assumed that every switch input contributes the same input load ρ, then $$q_{avg} \text{ is } q_{avg} = \frac{1}{K}\sum_{j=0}^{M-1}\rho_j^i = \frac{\rho \times M}{K} = \rho \times \text{Fair}.$$

In above ideal case, input shared blocks (ISBs) 1310 do not need to borrow/lend links from each other because traffic pattern in every input shared block (ISB) 1310 is exactly the same. The M (or M$_{out}$) links at every ATMCSF-OSB interface will be evenly allocated to every input shared block (ISB) 1310:

$$r_i^j = \frac{M}{K} = \text{Fair}; 0 \le i, j < K.$$

However, in practice, the input load to an input shared block (ISB) 1310 is dynamically changed and different from the input load to the other input shared blocks (ISBs) 1310. To be fair for every input shared block (ISB), the criteria to choose HT and LT may be HT≧q$_{avg}$ and LT≦q$_{avg}$.

If queue occupancy of a grouped virtual output queue (GVOQ) in an input shared block (ISB) 1310 is larger than the high threshold (HT), the input shared block (ISB) 1310 can request an extra link to the related output shared block (OSB) 1320 because its traffic load to the output shared block (OSB) 1320 is heavier than the normal load q$_{avg}$. If the queue occupancy of a grouped virtual output queue (GVOQ) in an input shared block (ISB) 1310 is less than the low threshold (LT), the input shared block (ISB) 1310 can release a link if other input shared blocks (ISBs) 1310 have link requests. Hence, the queue occupancy based dynamic link reservation (QOBDLR) technique provides a fair resource allocation among input shared blocks (ISBs) 1310.

The values of the high and low thresholds (HT and LT) may have multiple choices. Exemplary values of the high and low thresholds (HT and LT) for the third switch architecture 1300 if it is an 256 by 256 switch and has eight (8) input shared blocks (ISBs) 1310 and eight (8) output shared blocks (OSBs) 1320, i.e., N=256, K=8, m=M=32 have been determined. The possible choices of high and low thresholds (HT and LT) may be based on different input loads ρ. The high and low thresholds (HT and LT) should be suitable to handle most of the possible traffic loading. Since traffic load to a switch input is usually more than 50% (i.e., ρ>0.5), LT is chosen as 2. When traffic is less than 50% (i.e., ρ<0.5), the M$_{out}$ links at an ATMCSF-OSB interface is most likely sufficient to support cell delivery from all input shared blocks (ISBs) 1310. To determine the high threshold (HT), the joint set of values of the high threshold (HT) to satisfy all possible traffic load is: HT∈[4, ∞]. If the high threshold (HT) is very large, link request will be activated much more slowly because queue occupancy is not easy to exceed the high threshold (HT). Therefore, an input shared block (ISB) 1310 may not be able to increase its link reservation timely to adapt the increasing traffic. With the foregoing concern, the high threshold (HT) may be selected as 4, above which an input shared block (ISB) 1310 starts requesting an additional link. Hence, link reservation can adapt the traffic in a real time manner.

The "fair" parameter may be defined as $\lfloor M_{out}/K_{in} \rfloor$.

The third switch architecture 1300 is scalable due to its modular configuration using input shared blocks (ISBs) 1310, output shared blocks (OSBs) 1320 and the central switching fabric (ATMCSF) 1330. The third switch 1300 benefits from input and output link sharing. Consequently, no speedup is necessary in the central switch fabric 1330. Note however, that if $m_{in}<M_{in}$ and/or $m_{out}<M_{out}$, then speedup may be implemented. The central switch fabric (ATMCSF) 1330 can be implemented with any type of switch architecture such as crossbar, Banyan network or Clos network for example. Finally, the third switch 1300 enjoys high scalability.

The queue occupancy based dynamic link reservation (QOBDLR) techniques are distributed link reservation schemes. In every reservation slot (Rsv_Slot) 1215, an input shared block (ISB) 1310 modifies its link reservation for only two (2) output shared blocks (OSBs) 1320 which are identified by the received pair of REQ and REL tokens 1343 and 1345, respectively. Arbitration on "borrowing" and/or "lending" a link to a specific output shared block (OSB) 1320 is based on the queue occupancy of two (2) related grouped virtual output queues (GVOQs). Since an input shared block (ISB) 1310 modifies its link reservation according to its local available information, arbitration does not undergo multiple iterations and complexity is only O(1). In addition, dynamic link reservation in the queue occupancy based dynamic link reservation (QOBDLR) technique is triggered by explicit link requests. As a REQ token 1343 passes input shared blocks (ISBs) 1310 one by one in a round robin manner, an input shared block (ISB) 1310 that had issued a link request for a specific output shared block (OSB) 1320 will most likely obtain the desired link from its downstream neighboring input shared blocks (ISBs) 1310 in several reservation cycle(s) (Rsv_Cycle(s)) 1215. A link request that needs to traverse a complete ring to be granted an available link is less likely to occur.

As shown in FIG. 23, a cell slot 1210 includes multiple reservation slots (Rsv_Slot(s)) 1215, usually Cell_Slot>>Rsv_Slot. As shown, an input shared block (ISB) 1310 (e.g., the $i^{th}$ ISB) receives a pair of REQ (e.g., REQ$_j$) and REL (e.g., REL$_n$) tokens 1343 and 1345, respectively, in every reservation slot (Rsv_Slot), usually j≠n. Hence, an input shared block (ISB) 1310 (e.g., the $i^{th}$ (ISB)) is allowed to modify its link reservation for the identified two (2) output shared blocks (OSBs) 1320 (i.e., $r^i_j$ and $r^i_n$) in a reservation slot (Rsv_Slot) 1215. The Cell_Slot 1210 is independent of the reservation slots (Rsv_Slot) 1215. That is, when a cell slot is due, every input shared block (ISB) 1310 delivers cells to central switch fabric according to its current link reservation vector.

§ 4.4 CONCLUSIONS

Under uniform traffic, the first, second and third switch architectures can achieve a comparable performance as the output-queued (OQ) switch under any input load. On throughput performance, the output-queued (OQ) switch always reaches the maximized throughput, while the switches of the present invention closely approach the output-queued (OQ) switch with minimal throughput degradation. In general, the end-to-end cell delay increases with input load ρ.

The second and third switch architectures outperform the first—apparently by utilizing link reservation. However, under uniform traffic, link reservation is not as important. Accordingly, under such conditions, the first switch 400 still can achieve performance very similar to the second and third switches. When input load is heavy such as ρ=0.99 or 0.90, the second switch 1000 gains a little bit better performance than the third switch 1300, under the condition that the link reservation rate in the second switch 1000 (Cell_Slot= 4Rsv_Slot) is faster than that in third switch 1300 (Cell_Slot=Rsv_Slot). If running in the rate of Cell_Slot=Rsv_Slot, the second switch 100 will achieve the same performance as the first switch 400, neither of which is as good as that of the third switch 1300.

Under non-uniform traffic condition, the third switch 1300 outperforms the first and second switches. Indeed, it achieves a comparable performance as the output queued (OQ) switch under non-uniform traffic. The third switch 1300 benefits from the dynamic link reservation which does not need to reset link reservation vectors in every cell slot.

From an architecture point of view, all of the three switches are scalable due to the modular configuration using input shared blocks (ISBs), output shared blocks (OSBs) and central switch fabric (ATMCSF). These switches enjoy a unique feature of employing both input link sharing and output link sharing. No speedup is necessary in the central switch fabric. Alternatively, speedup can be provided by selecting M>m. In addition, a grouped virtual output queue (GVOQ) is used to achieve a fast cell forwarding and a simple cell scheduling especially under multicast traffic. Although the third switch architecture was described with grouped virtual output queues, individual virtual output queues may be used instead.

Each of the scheduling techniques are distributed and scalable because scheduling arbitration is carried out in every input shared block (ISB) according to its local available information. Complexity is very low.

What is claimed is:

1. In a switch having $N_{in}$ input ports applied to $K_{in}$ input shared blocks, a central switching fabric, and $N_{out}$ output ports provided from $K_{out}$ output shared blocks, a method for scheduling packets queued at the input shared blocks for application to the output ports, the method comprising steps of:

a) for each of the input shared blocks, providing a request token associated with one of the output shared blocks, each of the request tokens including an indication based on a number of requested links for the output shared block with which it is associated;

b) for each of the input shared blocks, providing a release token associated with one of the output shared blocks, each of the release tokens including an indication based on a number of released links for the output shared block with which it is associated;

c) for each of one or more reservation time slots within a cell time slot, i) accepting, by an input shared block, a request token from another input shared block, ii) determining whether a virtual output queue of the input shared block associated with the output shared block with which the request token is associated, is heavily occupied, iii) if it is determined that the virtual output queue of the input shared block associated with the output shared block with which the request token is associated is heavily occupied, then
A) requesting at least one extra link to the output shared block associated with the accepted request token,
iv) determining whether the virtual output queue of the input shared block associated with the output shared block with which the request token is associated, is lightly occupied,
v) if it is determined that the virtual output queue of the input shared block associated with the output shared block with which the request token is associated is lightly occupied, then
A) releasing at least one link to the output shared block associated with the accepted request token if it is indicated that a number of requested links for the output shared block is greater than zero,
vi) if it is determined that the virtual output queue of the input shared block associated with the output shared block with which the request token is associated is not lightly occupied, then
A) releasing at least one link to the output shared block associated with the accepted request token if the input shared block reserved more than a predetermined number of links and if it is indicated that a number of requested links for the output shared block is greater than zero,
vii) accepting, by the input shared block, a release token from another input shared block;
viii) determining whether or not the input shared block can take a link to the output shared block associated with the release token,
ix) if it is determined that the input shared block can take a link to the output shared block associated with the release token, then taking a link from the release token.

2. The method of claim 1 wherein the step of determining whether a virtual output queue of the input shared block associated with the output shared block with which the request token is associated, is heavily occupied, is based on a comparison with a threshold value.

3. The method of claim 1 wherein the step of requesting an extra link to the output shared block associated with the accepted request token, is effected by setting a request indicator corresponding to the input shared block and the output shared block, and incrementing the indication based on the number of links to the output shared block requested.

4. The method of claim 1 wherein the step of determining whether the virtual output queue of the input shared block associated with the output shared block with which the request token is associated, is lightly occupied, is based on a comparison with a threshold value.

5. The method of claim 1 wherein the step of releasing a link to the output shared block associated with the accepted request token is effected by decreasing the indication based on the number of links to the output shared block released.

6. The method of claim 1 wherein the step of determining whether or not the input shared block can take a link to the output shared block associated with the release token, is based on a number of all reserved links by the input shared block and an indication of whether or not the input shared block had requested a link to the output shared block.

7. The method of claim 1 further comprising a step of:
d) delivering, by each of the input shared blocks, cells to the central switch fabric based on current indications of a number of link reservations to each of the output shared blocks, at the end of a cell time slot.

8. In a switch having $N_{in}$ input ports applied to $K_{in}$ input shared blocks, a central switching fabric, and $N_{out}$ output ports provided from $K_{out}$ output shared blocks, a method for scheduling packets queued at the input shared blocks for application to the output ports, the method comprising steps of:
a) for each of the input shared blocks, providing a request token associated with one of the output shared blocks, each of the request tokens including an indication based on a number of requested links for the output shared block with which it is associated;
b) for each of the input shared blocks, providing a release token associated with one of the output shared blocks, each of the release tokens including an indication based on a number of released links for the output shared block with which it is associated;
c) for each of one or more reservation time slots within a cell time slot,
i) accepting, by an input shared block, a request token from an another input shared block,
ii) determining whether a virtual output queue of the input shared block associated with the output shared block with which the request token is associated, is heavily occupied,
iii) if it is determined that the virtual output queue of the input shared block associated with the output shared block with which the request token is associated is heavily occupied, then
A) requesting at least one extra link to the output shared block associated with the accepted request token,
iv) determining whether the virtual output queue of the input shared block associated with the output shared block with which the request token is associated, is lightly occupied,
v) if it is determined that the virtual output queue of the input shared block associated with the output shared block with which the request token is associated is lightly occupied, then
A) releasing at least one link to the output shared block associated with the accepted request token if it is indicated that a number of requested links for the output shared block is greater than zero,
vi) if it is determined that the virtual output queue of the input shared block associated with the output shared block with which the request token is associated is not lightly occupied, then
A) releasing at least one link to the output shared block associated with the accepted request token if the input shared block reserved more than a predetermined number of links,
vii) accepting, by the input shared block, a release token from another input shared block,
viii) determining whether to release at least one link to the output shared block with which the accepted release token is associated based on a queue occupancy, a number of links reserved, and a predetermined number of links
ix) if it has been determined to release a link to the output shared block with which the accepted release token is associated, releasing a link,
x) determining whether or not to take at least one released link to the output shared block with which the accepted release token is associated based on queue occupancy, a number of links reserved, and a number of links between the input shared block and the central switch fabric, and xi) if it is determined to take at least one released link to the output shared block with which the accepted release token is associated, taking at least one link.

9. The method of claim 8 wherein the step of determining whether a virtual output queue of the input shared block associated with the output shared block with which the request token is associated, is heavily occupied, is based on a comparison with a threshold value.

10. The method of claim 8 wherein the step of requesting at least one extra link to the output shared block associated with the accepted request token, is effected by setting a request indicator corresponding to the input shared block and the output shared block, and incrementing the indication based on the number of links to the output shared block requested.

11. The method of claim 8 wherein the step of determining whether the virtual output queue of the input shared block associated with the output shared block with which the request token is associated, is lightly occupied, is based on a comparison with a threshold value.

12. The method of claim 8 wherein the step of releasing at least one link to the output shared block associated with the accepted request token is effected by decreasing the indication based on the number of links to the output shared block released.

13. The method of claim 8 wherein the step of determining whether or not the input shared block can take at least one link to the output shared block associated with the release token, is based on a queue occupancy of a virtual output queue, and a number of all reserved links by the input shared block and an indication of whether or not the input shared block had requested at least one link to the output shared block if it is indicated that a number of released links for the output shared block is greater than zero.

14. The method of claim 8 further comprising a step of:

d) delivering, by each of the input shared blocks, cells to the central switch fabric base based on current indications of a number of link reservations to each of the output shared blocks, at the end of a cell time slot.

15. A switch for switching packets arriving at a number of input ports to an appropriate one of a number of output ports, the switch comprising:

a) a central switching fabric;

b) output shared blocks, each coupled with at least one output port;

c) links between the central switch fabric and each of the output shared blocks d) input shared blocks, each
  i) coupled with at least one input port,
  ii) having virtual output queues, each of the virtual output queues corresponding to one or more output ports,
  iii) storing
    A) an indication of whether at least one links to each of the output shared blocks has been requested,
    B) a release value based on a number of links to each of the output shared blocks released, and
    C) a link reservation value based on a number of links reserved to each of the output shared blocks;

e) request tokens, each associated with a particular one of the output shared blocks and each indicating a number of requests for links to the associated one of the output shared blocks;

f) release tokens, each associated with a particular one of the output shared blocks and each indicating a number of released links to the associated one of the output shared blocks; and g) links between the central switch fabric and each of the input shared blocks.

16. The switch of claim 15 wherein each of the input shared blocks holds at least one of the request tokens and at least one of the release tokens during a reservation time slot.

* * * * *